United States Patent
Gupta et al.

(10) Patent No.: US 10,198,356 B2
(45) Date of Patent: *Feb. 5, 2019

(54) DISTRIBUTED CACHE NODES TO SEND REDO LOG RECORDS AND RECEIVE ACKNOWLEDGMENTS TO SATISFY A WRITE QUORUM REQUIREMENT

(71) Applicant: Amazon Technologies, Inc., Seattle, WA (US)

(72) Inventors: Anurag Windlass Gupta, Atherton, CA (US); Matthew David Allen, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/881,623

(22) Filed: Jan. 26, 2018

(65) Prior Publication Data

US 2018/0150397 A1    May 31, 2018

Related U.S. Application Data

(63) Continuation of application No. 14/085,668, filed on Nov. 20, 2013, now Pat. No. 9,880,933.

(51) Int. Cl.
*G06F 12/00*      (2006.01)
*G06F 12/0815*    (2016.01)
(Continued)

(52) U.S. Cl.
CPC .......... *G06F 12/0815* (2013.01); *G06F 3/067* (2013.01); *G06F 12/0868* (2013.01); *G06F 17/30224* (2013.01); *G06F 2211/1028* (2013.01)

(58) Field of Classification Search
CPC .......... G06F 12/0815; G06F 17/30224; G06F 3/067; G06F 2211/1028; G06F 12/0868
(Continued)

(56) References Cited

U.S. PATENT DOCUMENTS 5,193,166 A    3/1993    Menasce
5,280,612 A    1/1994    Lorie et al.
(Continued)

FOREIGN PATENT DOCUMENTS

CA    2783370    7/2011
EP    0675451    10/1995
(Continued)

OTHER PUBLICATIONS

"Amazon Web Services Blog" Downloaded Apr. 30, 2013 from http://aws.typepad.com/aws/2010/10/amazon-rdsannouncing-read-replicas.html, Published Oct. 5, 2010 pp. 1-11.
(Continued)

*Primary Examiner* — Hong C Kim
(74) *Attorney, Agent, or Firm* — Robert C. Kowert; Meyertons, Hood, Kivlin, Kowert & Goetzel, P.C.

(57) ABSTRACT

A separate distributed buffer cache system may be implemented for a storage client of a distributed storage system. Storage I/O requests may be sent from a storage client to one or more buffer cache nodes in a distributed buffer cache system that maintain portions of an in-memory buffer cache to which the requests pertain. The distributed buffer cache system may send the write requests on to the distributed storage system to be completed, and in response to receiving acknowledgements from the storage system, sending a completion acknowledgement back to the storage client. Buffer cache nodes may update buffer cache entries for received requests such that they are not available for reads until complete at the distributed storage system. For read
(Continued)

requests where the buffer cache entries at the buffer cache node are invalid, valid data may be obtained from the distributed storage system and sent to the storage client.

20 Claims, 16 Drawing Sheets

(51) Int. Cl.
G06F 12/0868 (2016.01)
G06F 3/06 (2006.01)
G06F 17/30 (2006.01)

(58) Field of Classification Search
USPC .............. 711/120, 129, 143, 113; 712/28; 707/683, 672
See application file for complete search history.

(56) References Cited

U.S. PATENT DOCUMENTS

| | | | |
|---|---|---|---|
| 5,452,445 A | 9/1995 | Hallmark et al. |
| 5,471,614 A | 11/1995 | Kakimoto |
| 5,524,205 A | 6/1996 | Lomet et al. |
| 5,530,850 A | 6/1996 | Ford et al. |
| 5,787,267 A | 7/1998 | Leung et al. |
| 5,870,758 A | 2/1999 | Bamford et al. |
| 5,907,848 A | 5/1999 | Zaiken et al. |
| 5,951,695 A | 9/1999 | Kolovson |
| 6,041,423 A | 3/2000 | Tsukerman |
| 6,233,585 B1 | 5/2001 | Gupta et al. |
| 6,240,413 B1 | 5/2001 | Learmont |
| 6,615,219 B1 | 9/2003 | Bruso et al. |
| 6,631,374 B1 | 10/2003 | Klein et al. |
| 6,732,124 B1 | 5/2004 | Koseki et al. |
| 6,732,171 B2 | 5/2004 | Hayden |
| 6,832,229 B2 | 12/2004 | Reed |
| 6,859,861 B1 | 2/2005 | Rhodes |
| 6,976,022 B2 | 12/2005 | Vemuri et al. |
| 7,010,645 B2 | 3/2006 | Hetzler et al. |
| 7,089,253 B2 | 8/2006 | Hinshaw et al. |
| 7,146,386 B2 | 12/2006 | Xiao |
| 7,287,034 B2 | 10/2007 | Wong et al. |
| 7,305,386 B2 | 12/2007 | Hinshaw et al. |
| 7,308,456 B2 | 12/2007 | Friske et al. |
| 7,328,226 B1 | 2/2008 | Karr et al. |
| 7,716,645 B2 | 5/2010 | Dolby et al. |
| 7,747,663 B2 | 6/2010 | Atkin et al. |
| 7,885,922 B2 | 2/2011 | Pareek et al. |
| 7,930,271 B2 | 4/2011 | Tarbell |
| 7,937,551 B2 | 5/2011 | Schott |
| 7,979,670 B2 | 7/2011 | Saliba et al. |
| 8,209,515 B2 | 6/2012 | Schott |
| 8,255,627 B2 | 8/2012 | Blinick et al. |
| 8,266,114 B2 | 9/2012 | Mace et al. |
| 8,271,830 B2 | 9/2012 | Erofeev |
| 8,289,801 B2 | 10/2012 | Smith et al. |
| 8,301,670 B2 | 10/2012 | Revah et al. |
| 8,326,897 B2 | 12/2012 | Butterworth et al. |
| 8,341,128 B1 | 12/2012 | Ruggiero |
| 8,370,715 B2 | 2/2013 | Hafner et al. |
| 8,380,670 B2 | 2/2013 | Kuber et al. |
| 8,392,479 B1 | 3/2013 | Pantin |
| 8,396,831 B2 | 3/2013 | Larson et al. |
| 8,412,689 B2 | 4/2013 | Reid et al. |
| 8,412,752 B2 | 4/2013 | Dodge |
| 8,429,121 B2 | 4/2013 | Pareek et al. |
| 9,880,933 B1 * | 1/2018 | Gupta ................ G06F 12/0815 |
| 2002/0107835 A1 | 8/2002 | Coram et al. |
| 2002/0143733 A1 | 10/2002 | Mukkamalla et al. |
| 2004/0044850 A1 | 3/2004 | George et al. |
| 2004/0054643 A1 * | 3/2004 | Vemuri ............. G06F 17/30371 |
| 2004/0133622 A1 | 7/2004 | Clubb et al. |
| 2004/0148316 A1 * | 7/2004 | Bridge, Jr. .......... G06F 11/1461 |
| 2004/0225696 A1 | 11/2004 | Wong et al. |
| 2004/0249869 A1 | 12/2004 | Oksanen |
| 2006/0020634 A1 | 1/2006 | Huras et al. |
| 2006/0047626 A1 | 3/2006 | Raheem |
| 2006/0117074 A1 * | 6/2006 | Ezzat ................. G06F 11/1471 |
| 2006/0224636 A1 | 10/2006 | Kathuria et al. |
| 2007/0174541 A1 | 6/2007 | Chandrasekaran et al. |
| 2007/0214383 A1 | 9/2007 | Brown et al. |
| 2008/0010322 A1 | 1/2008 | Lee et al. |
| 2008/0183973 A1 | 7/2008 | Aguilera et al. |
| 2008/0294648 A1 | 11/2008 | Lin et al. |
| 2009/0074191 A1 | 3/2009 | Gatto et al. |
| 2009/0249001 A1 | 10/2009 | Narayanan et al. |
| 2010/0036861 A1 | 2/2010 | Srihari et al. |
| 2010/0050172 A1 | 2/2010 | Ferris |
| 2010/0082547 A1 | 4/2010 | Mace et al. |
| 2010/0153415 A1 | 6/2010 | Muntz |
| 2010/0192131 A1 | 7/2010 | Dolby et al. |
| 2011/0035548 A1 | 2/2011 | Kimmel et al. |
| 2011/0060724 A1 | 3/2011 | Chan |
| 2011/0072217 A1 | 3/2011 | Hoang et al. |
| 2011/0161496 A1 | 6/2011 | Nicklin |
| 2011/0251997 A1 | 10/2011 | Wang et al. |
| 2012/0005196 A1 | 1/2012 | Horii |
| 2012/0011106 A1 | 1/2012 | Reid et al. |
| 2012/0041899 A1 | 2/2012 | Greene et al. |
| 2012/0166390 A1 | 6/2012 | Merriman et al. |
| 2012/0174112 A1 | 7/2012 | Vaidya et al. |
| 2012/0191648 A1 | 7/2012 | Kuber et al. |
| 2012/0259889 A1 | 10/2012 | Dinker et al. |
| 2012/0297073 A1 | 11/2012 | Glover et al. |
| 2012/0310985 A1 | 12/2012 | Gale et al. |
| 2012/0310986 A1 | 12/2012 | Frantz et al. |
| 2012/0310991 A1 | 12/2012 | Frantz et al. |
| 2012/0323849 A1 | 12/2012 | Garin, Jr. et al. |
| 2013/0036281 A1 | 2/2013 | Revah et al. |
| 2013/0042056 A1 | 2/2013 | Shats et al. |
| 2013/0042156 A1 | 2/2013 | Srinivasan et al. |
| 2013/0080386 A1 | 3/2013 | Dwyer et al. |
| 2013/0080388 A1 | 3/2013 | Dwyer et al. |
| 2013/0086129 A1 | 4/2013 | Brown et al. |
| 2014/0365734 A1 | 12/2014 | Bridge, Jr. et al. |

FOREIGN PATENT DOCUMENTS

| | | |
|---|---|---|
| EP | 1630674 | 3/2006 |
| JP | H10-254748 | 9/1998 |
| JP | 2005276094 | 10/2005 |
| JP | 2007200182 | 8/2007 |
| JP | 2007317017 | 12/2007 |
| JP | 2012014502 | 1/2012 |
| JP | 2012507072 | 3/2012 |

OTHER PUBLICATIONS

"Bloom Filter" Downloaded from http://en.wikipedia.org/wiki/Bloom_filter on May 15, 2013, pp. 1-12.
John Clarke "SQL Result Set Cache in Oracle 11 gR2" published Nov. 16, 2011 downloaded May 15, 2013 from http://www.centroid.com/knowledgebase/blog/sql-result-set-cache-in-oracle-11 gr2, pp. 1-27.
Jim Czuprynski "Oracle Database 11g: SQL Query Result Set Caching" published Jul. 30, 2008, downloaded May 15, 2013 from http://www.databasejournal.com/features/oracle/article.php/3760761/0racle-Database-11 g-SQL -Query-Result-Set-Caching.htm, pp. 1-7.
"Oracle Database JDBC Developer's Guide and Reference: Chapter 20 Statement and Result Set Caching" downloaded from http://docs.oracle.com/cd/B28359_01/java.1111b31224/stmtcach.htm via the Wayback Machine Nov. 27, 2011, pp. 1-8.
Adrian Billington "Query Result Cache in Oracle 11g" downloaded from http://web.archive.org/web/20080124161135/http://www.oracle-developer.net/display.php?id=503 via the Wayback Machine Jan. 4, 2008, pp. 1-20.
Julian Dontcheff "Bloom Filters for DBAs" published Aug. 28, 2012, downloaded from http://juliandontcheff.wordpress.com/2012/08/28/bloom-filters-for-dbas/ on May 14, 2013, pp. 1-4.
Julian Dyke "Result Cache Internals" Nov. 2007, pp. 1-38.

(56) References Cited

OTHER PUBLICATIONS

Michele Cyran et al "Oracle Database Concepts 10g Release 2 (10.2)" Oct. 2005, pp. 1-542.
Lance Ashdown et al "Oracle Database Concepts 11g Release 2 (11.2)" Sep. 2011, pp. 1-460.
"Isolation (database systems)" downloaded from http://en.wikipedia.org/wiki/Isolation_(database_systems) on May 15, 2013, pp. 1-7.
U.S. Appl. No. 13/892,027, filed May 10, 2013, Anurag Windlass Gupta.
U.S. Appl. No. 13/873,467, filed Apr. 30, 2013, Anurag Windlass Gupta.
U.S. Appl. No. 13/902,381, filed May 24, 2013, Anurag Windlass Gupta.
U.S. Appl. No. 13/893,004, filed May 13, 2013, Laurion Darrell Burchall.
U.S. Appl. No. 13/901,111, filed May 23, 2013, Anurag Windlass Gupta.
U.S. Appl. No. 13/894,969, filed May 15, 2013, Grant Alexander MacDonald McAlister.
U.S. Appl. No. 13/903,674, filed May 28, 2013, Anurag Windlass Gupta.
U.S. Appl. No. 14/033,343, filed Sep. 20, 2013, Tengiz Kharatishvili.
U.S. Appl. No. 14/032,721, filed Sep. 20, 2013, Tengiz Kharatishvili.
U.S. Appl. No. 14/032,797, filed Sep. 20, 2013, Pradeep Jnana Madhavarapu.
U.S. Appl. No. 14/036,783, filed Sep. 25, 2013, Anurag Windlass Gupta.
U.S. Appl. No. 14/036,792, filed Sep. 25, 2013, Samuel James McKelvie.
U.S. Appl. No. 14/094,154, filed Dec. 2, 2013, Pradeep Jnana Madhavarapu.
U.S. Appl. No. 14/032,763, filed Sep. 20, 2013, Yan Valerie Leshinsky.
U.S. Appl. No. 14/032,681, filed Sep. 20, 2013, Samuel James McKelvie.
Latika C. Savade, et al., "A Technique to Search Log Records using System of Linear Equations", Software Engineering (CONSEG), 2012 CSI Sixth International Conference, IEEE, Sep. 5, 2012, pp. 1-4.
Neeta Garimella, "Understanding and exploiting snapshot technology for data protection, Part 1: Snapshot technology overview", IBM developerWorks, Apr. 26, 2006, Retrieved from URL: https://web.archive.org/web/20070125115155/http://www-128.ibm.com/developerworks/tivoli/library/t-snaptsm1/index.html, pp. 1-7.
Jim Gray, et al., "Transaction Processing: Concepts and Techniques—Chapter 10", In: "The Morgan Kaufmann Series in data management systems", Jan. 1, 1993, pp. 529-582.
Jim Gray, et al., "Transaction Processing: Concepts and Techniques—Chapter 12", In: "The Morgan Kaufmann series in data management systems", Jan. 1, 1993, pp. 631-657.
Mokrane Bouzeghoub, et al., "A Framework for Analysis of Data Freshness", Information Quality in Information Systems, ACM, Jun. 18, 2004, pp. 59-67.
M. Tamer Ozsu, et al., "Princeiples of Distributed Database Systems—Chapter 13—Data Replication", In: Principles of Distributed Database Systems, Third Edition, Mar. 2, 2011, Springer, pp. 459-495.
Hector Garcia-Molina, et al., "Database Systems—The Complete Book Second Edition—Chapter 18—Concurrency Control", In: "Database systems the complete book, Second Edition", Jun. 15, 2005, pp. 883-951.
Atul Adya, et al., "Efficient Optimistic Concurrency Control Using Loosely Synchronized Clocks", SIGMOD Record, ACM, vol. 24, No. 2, May 22, 1995, pp. 23-34.
Jim Handy, "The Cache Memory Book", Second Edition, Academic Press, 1998, entire 123 pages.

\* cited by examiner

DISTRIBUTED CACHE NODES TO SEND REDO LOG RECORDS AND RECEIVE ACKNOWLEDGMENTS TO SATISFY A WRITE QUORUM REQUIREMENT

BACKGROUND

This application is a continuation of U.S. patent application Ser. No. 14/085,668, filed Nov. 20, 2013, now U.S. Pat. No. 9,880,933, which is hereby incorporated by reference herein in its entirety.

Persistent data storage is in high demand. Different organizations, companies, and individuals collect, transmit, and manage all kinds of data that needs to be stored. In order to more efficiently create or access stored data, different data storage systems may be implemented. Database systems, for example, provide data storage that may allow for data to be efficiently and consistently accessed and changed using various format and storage schemes.

Access requests for data stored in data storage systems may be processed differently. Some data storage systems may implement a buffer cache in order to more efficiently process access requests. For example, a buffer cache may maintain a copy of different portions of the data stored in a distributed storage system in persistent storage devices, such as disk storage. When writes to the data stored in the distributed storage system are to be performed, a copy of the data modified by the write may be stored in the buffer cache as well as the disk storage. Buffer caches are typically implemented in system memory that provides quick access times for reading and writing data. Future read requests for the data may be serviced using data stored in the buffer cache, without waiting for the read request to be serviced by the significantly slower persistent storage. Thus, storing more data in the buffer cache may reduce the need to perform more costly storage operations to read data from persistent storage.

System memory, however, is a scare resource when compared to persistent data storage. Generally, the buffer cache for storage clients storing data for a storage system may be limited to the system memory available to the device implementing the storage client, restricting the amount of data a buffer cache may contain. Yet, increasing the buffer cache size for storage clients may increase the operational and resource costs for storage clients, which may in turn reduce the effectiveness of implementing a buffer cache for storage clients.

Figure 1:
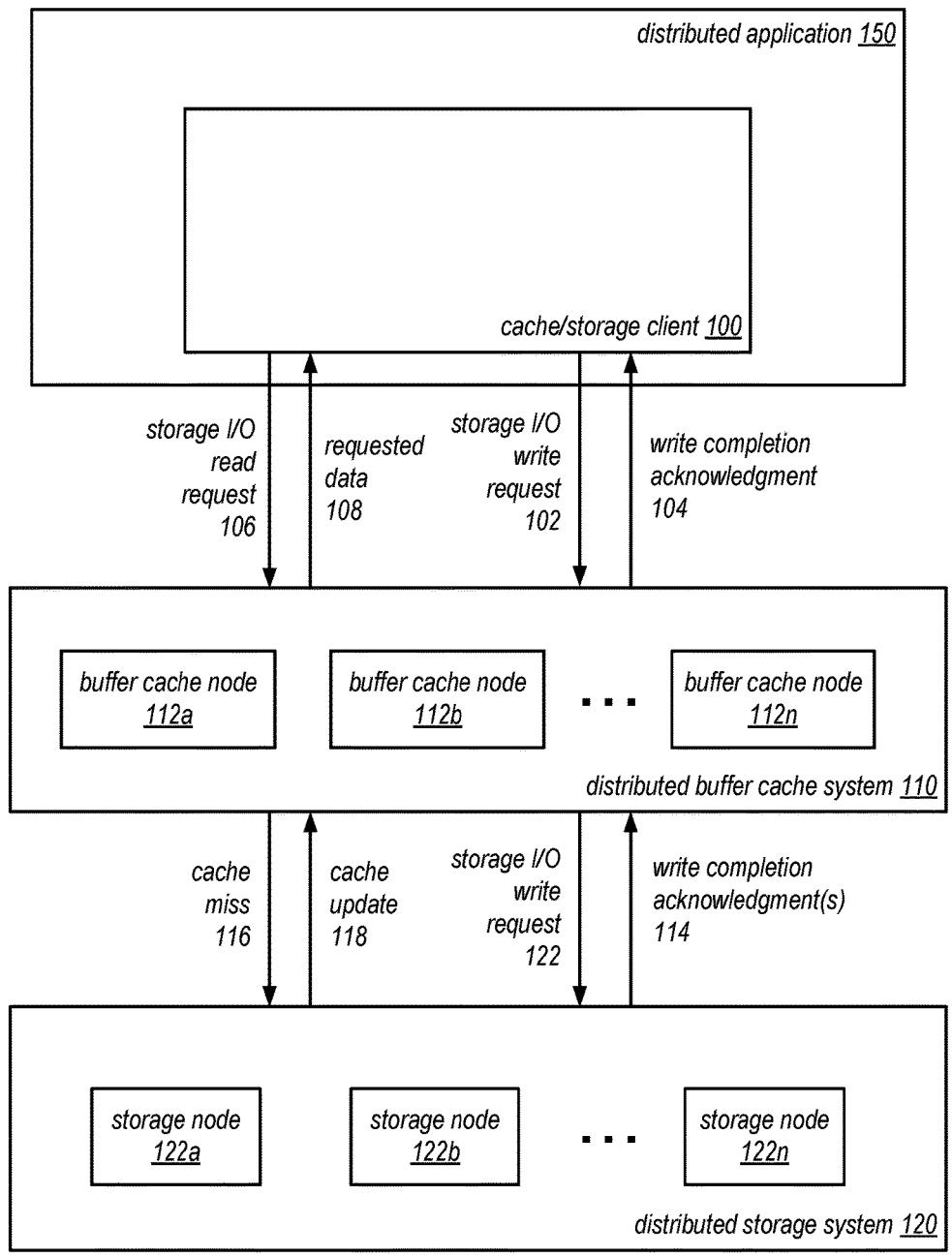
FIG. 1 is a block diagram illustrating a distributed buffer cache system, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a computer system may be configured to perform operations even when the operations are not currently being performed). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Various embodiments of a distributed in-memory buffer cache system are disclosed. Generally, an in-memory buffer cache may maintain portions of data stored for an application in system memory for which storage I/O (input/output) operations are also to be performed in persistent storage. For example, changes to data blocks (or pages) in block-based storage may be cached in an in-memory buffer cache. The results of the changes may be quickly accessed by an application without having to resort to performing a slower access operation to read data from persistent storage. Similarly, an in-memory buffer cache may maintain data for which a storage I/O read operation has already been performed (i.e., already ready from persistent storage) so that the cost to read the data is limited to the cost to access system memory. System memory may provide efficient access times when compared with block-based and/or other persistent storage. Thus data stored as part of an in-memory buffer cache may be quickly accessed for performing various application operations. Changes to data may be stored in system memory so that the efficient nature of system memory may be utilized. However, as system memory is not typically persistent or volatile (e.g., a system or power failure causes data loss), such data changes or storage I/O (input/output) operations may be eventually pushed out to non-volatile storage, which as noted above may be significantly more costly to access.

Typical in-memory buffer caches are limited to the amount of system memory local to a given application. Thus, increasing the size of in-memory buffer cache for storage I/O operations may be limited to the capacity of the particular system implementing the application. In various embodiments, a distributed buffer cache system may be utilized in addition to or instead of a local buffer cache for an application. Thus, changing needs for more or less buffer cache space may be scaled across one or more buffer cache nodes in a distributed buffer cache system. Buffer cache nodes may maintain different portions of an in-memory buffer cache for an application in respective system memories local to the buffer cache nodes in order to provide performance similar to a local in-memory buffer cache, such that the application may effectively operate as if all data were entirely stored in system memory.

FIG. 1 is a block diagram illustrating a distributed buffer cache system, according to some embodiments. A distributed application 150, such as a database, file management system, content provider, or any other application that may utilized a distributed storage system, may implement a cache/storage client 100 that may use a non-local, in-memory buffer cache located among buffer cache nodes in a distributed buffer cache system 110, and a separate distributed storage system 120. In various embodiments, instead of relying upon limited space available in a local system memory accessible to cache/storage client 100 (or in addition to a local buffer cache), distributed application 150 may utilize an in-memory buffer cache provided by distributed buffer cache system 110 that caches storage I/O requests with respect to data stored for distributed application 150 at distributed storage system 120. However, in various embodiments, distributed application 150 may not be aware that cache/storage client 100 uses distributed buffer cache system 110. Instead, cache/storage client 100 may act as an interface to distributed buffer cache system 110 that appears to distributed application 150 as a local buffer cache.

In various embodiments, cache/storage client 100 may determine (e.g., generate or receive) a storage I/O write request to update data stored at distributed storage system 120. Such a determination may be made based on a hashing scheme or other heuristic which may be used to apportion the in-memory buffer cache for the distributed application 150 among buffer cache nodes 112, in some embodiments. A storage I/O write request 102 may be sent to one or more buffer cache nodes 112a, 112b, through 112n implemented as part of distributed buffer cache system 110. Distributed buffer cache nodes may maintain portions of the in-memory buffer cache provided to cache/storage client 100. The buffer cache nodes 112 that receive the storage I/O write request may update buffer cache entries to which the write request pertains such that the updated buffer cache entries are not available for reads until the write request is determined to be complete at distributed storage system 120 (e.g., mark the buffer cache entries as "dirty" or "write-in-progress"). Buffer cache nodes may also determine one or more storage nodes 122 (such as storage nodes 122a, 122b, through 122n) implemented by distributed storage system 120 that store data for the distributed application 102. The buffer cache nodes 112 may then send the storage I/O write request 122 to the determine storage nodes 122 to be completed at the distributed storage system. One or more of storage nodes 112 may acknowledge completion of the write 114 back to the distributed buffer cache system. Based on acknowledgments from the distributed storage system 120, distributed buffer cache nodes 112 may acknowledge completion of the write 104 to cache/storage client 100.

In various embodiments, cache/storage client 100 may determine a storage I/O read request to be performed for distributed application 150. Cache storage client may determine one or more buffer cache nodes 112 to send the storage I/O read request 106. As noted above, such a determination may be made based on a hashing scheme or other heuristic which may be used to apportion the in-memory buffer cache for the distributed application 150 among buffer cache nodes 112, in some embodiments. A buffer cache node 112 may determine whether a valid version of specified data in the read request is maintained at the respective portion of the in-memory buffer cache at the buffer cache node 122. For valid buffer cache entries (sometimes referred to as a cache hit) the requested data 108 may be returned to cache/storage client 100. For invalid entries (e.g., marked as "dirty," "write-in-progress," or otherwise unavailable) a cache miss request 116 for the specified data may be sent to specific storage nodes 122 in the distributed storage system 120 maintaining the specified data for the storage I/O read request. The data may be returned to buffer cache nodes 112 as a cache update 118. The invalid buffer cache entries may be updated, and the requested data returned 108 to cache/storage client 100.

Distributed buffer cache system 110 may be implemented in a variety of different ways. Buffer cache nodes 112 may be dedicated systems or devices for distributed buffer cache system 110, or alternatively they may be provisioned compute nodes, systems, or devices, from another distributed storage system with system memory available to implement a portion of the in-memory buffer cache for distributed application 150. Different arrangements of buffer cache nodes may also be implemented, in various embodiments. For example, some buffer cache nodes may mirror the same portions of the in-memory buffer cache among multiple buffer cache nodes. The illustration and discussion of FIG. 1 is not intended to be limiting as to the various different ways a distributed buffer cache system may be implemented.

The specification first describes an example cache/storage client, a network-based database service, configured to use a separate distributed buffer cache system and distributed storage system. Included in the description of the example network-based database service are various aspects of the example network-based database service, such as a database engine, and the various interactions between the network-based database service and the separate distributed buffer cache system and the separate distributed database storage service. The specification then describes flowcharts of various embodiments of methods for implementing a distributed buffer cache system for storage clients. Next, the specification describes an example system that may implement the disclosed techniques. Various examples are provided throughout the specification.

The systems described herein may, in some embodiments, implement a network-based service that enables clients (e.g., subscribers) to operate a data storage system in a cloud computing environment. In some embodiments, the data storage system may be an enterprise-class database system that is highly scalable and extensible. In some embodiments, queries may be directed to a database that is distributed across multiple physical resources, and the database system may be scaled up or down on an as needed basis. The database system may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system.

More specifically, the systems described herein may, in some embodiments, implement a service-oriented database architecture in which various functional components of a single database system are intrinsically distributed. For example, rather than lashing together multiple complete and monolithic database instances (each of which may include extraneous functionality, such as an application server, search functionality, or other functionality beyond that required to provide the core functions of a database), these systems may organize the basic operations of a database (e.g., query processing, transaction management, caching and storage) into tiers that may be individually and independently scalable. For example, in some embodiments, each database instance in the systems described herein may include a database tier (which may include a single database engine head node and a client-side storage system driver), a separate distributed caching system (which may implement an in-memory buffer cache for the database that may maintain more data than may be maintained at a buffer cache maintained locally at the database), and a separate, distributed storage system (which may include multiple storage nodes that collectively perform some of the operations traditionally performed in the database tier of existing systems).

As described in more detail herein, buffer cache for storage I/O (input/output) operations to the distributed storage may be moved from the database engine to the distributed buffer cache system, distributed across multiple buffer cache nodes. A distributed buffer cache system may implement a write-through buffer cache, passing write operations on to the separate distributed storage system for completion, as discussed below. The distributed buffer cache system may also assume responsibility for determining whether storage I/O write requests have been completed at the distributed storage system, and communication acknowledgments of completion to the database engine. By assuming this responsibility, there may be much less network traffic between the database engine and the distributed storage system, than would be expected in a database system that does not utilize a distributed buffer cache system.

As described in more detail herein, in some embodiments, some of the lowest level operations of a database, (e.g., backup, restore, snapshot, recovery, log record manipulation, and/or various space management operations) may be offloaded from the database engine to the storage layer and distributed across multiple nodes and storage devices. For example, in some embodiments, rather than the database engine applying changes to a database (or data pages thereof) and then sending the modified data pages to the storage layer, the application of changes to the stored database (and data pages thereof) may be the responsibility of the storage layer itself. In such embodiments, redo log records, rather than modified data pages, may be sent to the storage layer, after which redo processing (e.g., the application of the redo log records) may be performed somewhat lazily and in a distributed manner (e.g., by a background process). In some embodiments, crash recovery (e.g., the rebuilding of data pages from stored redo log records) may also be performed by the storage layer and may also be performed by a distributed (and, in some cases, lazy) background process.

In some embodiments, because only redo logs (and not modified data pages) are sent to the storage layer, there may be much less network traffic between the database tier and the storage layer than in existing database systems. In some embodiments, each redo log may be on the order of one-tenth the size of the corresponding data page for which it specifies a change. Note that requests sent from the database tier and the distributed storage system may be asynchronous and that multiple such requests may be in flight at a time.

Figure 2:
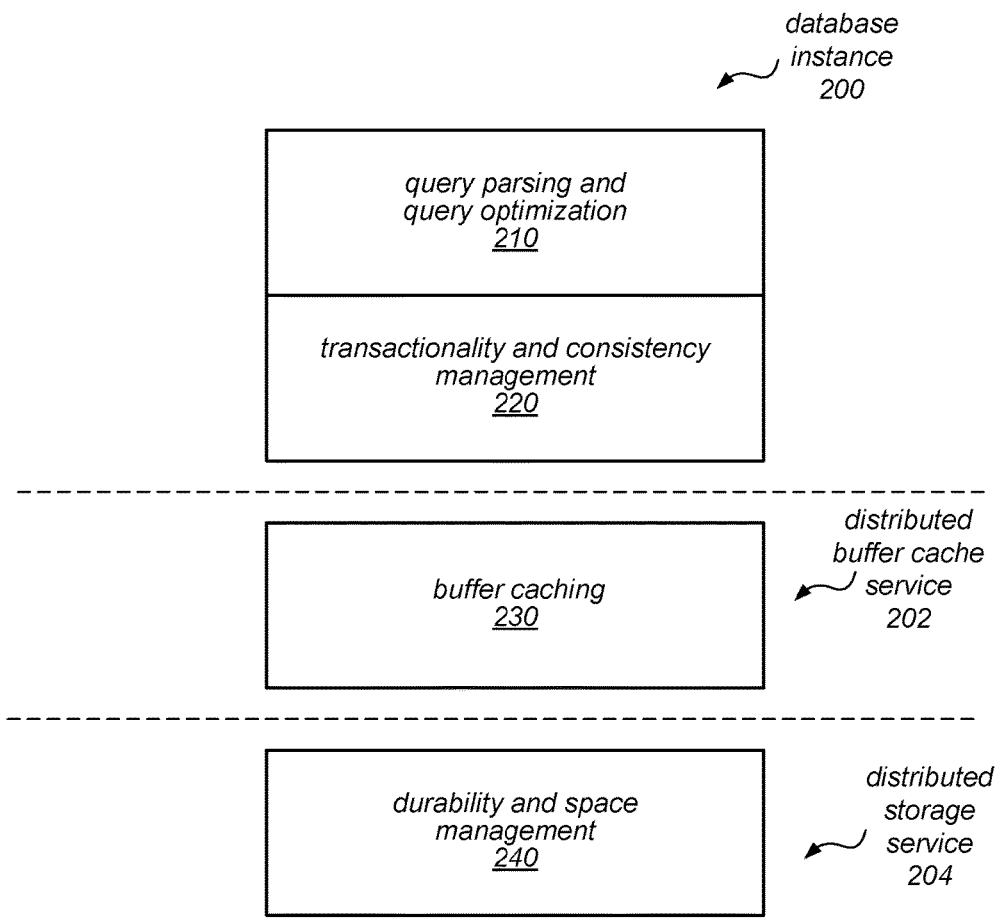
FIG. 2 is a block diagram illustrating various components of a database software stack moved into separate distributed systems, according to some embodiments.

In general, after being given a piece of data, a primary requirement of a database is that it can eventually give that piece of data back. To do this, the database may include several different components (or tiers), each of which performs a different function. FIG. 2 is a block diagram illustrating various components of a database software stack moved into separate distributed systems, according to some embodiments. For example, a traditional database may be thought of as having four tiers: a first tier for performing query parsing, optimization and execution, as indicated at 210; a second tier for providing transactionality, recovery, and durability as indicated at 220; a third tier for performing buffer caching of storage I/O operations as indicated at 230; and a fourth tier that provides storage, either on locally attached disks or on network-attached storage, as indicated at 240. As noted above, previous attempts to scale a traditional database have typically involved replicating all three tiers of the database and distributing those replicated database instances across multiple machines.

In some embodiments, the systems described herein may partition functionality of a database system differently than in a traditional database, and may distribute only a subset of the functional components (rather than a complete database instance) across multiple machines in order to implement scaling. For example, in some embodiments, a database instance 200 may include a client-facing tier (210) may be configured to receive a request specifying what data is to be stored or retrieved, but not how to store or retrieve the data. This tier may perform request parsing and/or optimization (e.g., SQL parsing and optimization), while another tier may be responsible for query execution. In some embodiments, a second tier (220) may be responsible for providing transactionality and consistency of results. For example, this tier may be configured to enforce some of the so-called ACID properties, in particular, the Atomicity of transactions that target the database, maintaining Consistency within the database, and ensuring Isolation between the transactions that target the database. In some embodiments a distributed buffer cache service 202 may implement the third tier (230) that provides for in-memory buffer caching of storage I/O operations in order to more efficiently service storage I/O read requests. In some embodiments, a fourth tier (240) implemented as part of a separate distributed storage service 204 may then be responsible for providing durability of the stored data in the presence of various sorts of faults. For example, this tier may be responsible for change logging, recovery from a database crash, managing access to the underlying storage volumes and/or space management in the underlying storage volumes.

In some embodiments, the database systems described herein may retain much of the structure of the database instance 200 as illustrated in FIG. 2, but may redistribute responsibility for buffer caching to the distributed buffer caching service 202 and at least portions of the backup, restore, snapshot, recovery, and/or various space management operations to the storage service 204. Redistributing functionality in this manner and tightly coupling log processing between the database tier, buffer cache tier, and the storage tier may improve performance, increase availability and reduce costs, when compared to previous approaches to providing a scalable database. For example, network and input/output bandwidth requirements may be reduced, since only redo log records (which are much smaller in size than the actual data pages) may be shipped across nodes or persisted within the latency path of write operations. In addition, the generation of data pages can be done independently in the background on each storage node (as foreground processing allows), without blocking incoming write operations. In some embodiments, the use of log-structured, non-overwrite storage may allow backup, restore, snapshots, point-in-time recovery, and volume growth operations to be performed more efficiently, e.g., by using metadata manipulation rather than movement or copying of a data page. In some embodiments, the storage layer may also assume the responsibility for the replication of data stored on behalf of clients (and/or metadata associated with that data, such as redo log records) across multiple storage nodes. For example, data (and/or metadata) may be replicated locally (e.g., within a single "availability zone" in which a collection of storage nodes executes on its own physically distinct, independent infrastructure) and/or across availability zones in a single region or in different regions.

In various embodiments, the database systems described herein may support a standard or custom application programming interface (API) for a variety of database operations. For example, the API may support operations for creating a database, creating a table, altering a table, creating a user, dropping a user, inserting one or more rows in a table, copying values, selecting data from within a table (e.g., querying a table), canceling or aborting a query, creating a snapshot, and/or other operations.

In some embodiments, the database tier of a database instance may include a database engine head node server that receives read and/or write requests from various client programs (e.g., applications) and/or subscribers (users), then parses them and develops an execution plan to carry out the associated database operation(s). For example, the database engine head node may develop the series of steps necessary to obtain results for complex queries and joins. In some embodiments, the database engine head node may manage communications between the database tier of the database system and clients/subscribers, as well as communications between the database tier and a separate distributed database-optimized storage system.

In some embodiments, the database engine head node may be responsible for receiving SQL requests from end clients through a JDBC or ODBC interface and for performing SQL processing and transaction management (which may include locking) locally. However, rather than generating data pages locally, the database engine head node (or various components thereof) may generate redo log records and may ship them to the appropriate nodes of a separate distributed buffer cache system or directly to the separate distributed storage system. In some embodiments, a client-side driver for the distributed buffer cache system and the distributed storage system may be hosted on the database engine head node and may be responsible for routing redo log records to the appropriate buffer cache node storing a buffer cache entry soring the data page to which the log records pertain (and/or to the appropriate storage node in the distributed storage system). Buffer cache nodes may also implement a storage service driver to send redo log records to a storage system node (or nodes) that store the segments (or data pages thereof) to which those redo log records are directed (as may a database engine head node when communicating directly with the distributed storage system). For example, in some embodiments, each segment may be mirrored (or otherwise made durable) on multiple storage system nodes that form a protection group. In such embodiments, the storage service driver may keep track of the nodes on which each segment is stored and may route redo logs to all of the nodes on which a segment is stored (e.g., asynchronously and in parallel, at substantially the same time), when a storage I/O write request is received. As soon as the storage service driver receives an acknowledgement back from a write quorum of the storage nodes in the protection group (which may indicate that the redo log record has been written to the storage node), it may send an acknowledgement of the requested change to the database tier (e.g., to the database engine head node). For example, in embodiments in which data is made durable through the use of protection groups, the database engine head node may not be able to commit a transaction until and unless the client-side driver receives a reply from the buffer cache node that the write is complete, ensuring that the buffer cache node has received replies from enough storage node instances to constitute a write quorum.

In some embodiments, the database tier (or more specifically, the database engine head node) may include a local cache in which recently accessed data pages are held temporarily. In such embodiments, if a write request is received that targets a data page held in such a cache, in addition to shipping a corresponding redo log record to the storage layer, the database engine may apply the change to the copy of the data page held in its cache. However, unlike in other database systems, a data page held in this cache may not ever be flushed to the storage layer, and it may be discarded at any time (e.g., at any time after the redo log record for a write request that was most recently applied to the cached copy has been sent to the storage layer and acknowledged). The cache may implement any of various locking mechanisms to control access to the cache by at most one writer (or multiple readers) at a time, in different embodiments. Note, however, that this cache may be, maintained locally at individual nodes, unlike the in-memory buffer cache maintained for the database instance among a multiple buffer cache nodes.

In some embodiments, the database tier may support the use of synchronous or asynchronous read replicas in the system, e.g., read-only copies of data on different nodes of the database tier to which read requests can be routed. In such embodiments, if the database engine head node for a given database receives a read request directed to a particular data page, it may route the request to any one (or a particular one) of these read-only copies. In some embodiments, the client-side driver in the database engine head node may be configured to notify these other nodes about updates and/or invalidations to locally cached data pages (e.g., in order to prompt them to invalidate their caches, after which they may request updated copies of updated data pages from the storage layer).

In some embodiments, the storage service driver running on buffer cache nodes may expose a private interface to the storage tier. In some embodiments, it may also expose a traditional iSCSI interface to one or more other components (e.g., other database engines or virtual computing services components). In some embodiments, storage for a database instance in the storage tier may be modeled as a single volume that can grow in size without limits, and that can have an unlimited number of IOPS associated with it. When a volume is created, it may be created with a specific size, with a specific availability/durability characteristic (e.g., specifying how it is replicated), and/or with an IOPS rate associated with it (e.g., both peak and sustained). For example, in some embodiments, a variety of different durability models may be supported, and users/subscribers may be able to specify, for their database, a number of replication copies, zones, or regions and/or whether replication is synchronous or asynchronous based upon their durability, performance and cost objectives.

In some embodiments, the storage service driver at buffer cache nodes (and the client side driver at the database engine head node) may maintain metadata about the volume and may directly send asynchronous requests to each of the storage nodes necessary to fulfill read requests and write requests without requiring additional hops between storage nodes. For example, in some embodiments, in response to a request to make a change to a database, the client-side driver may be configured to determine the one or more buffer cache nodes that maintain the target data page for the change to the database, and route redo log records to be applied to that data page to the one or more buffer cache nodes. The one or more buffer cache nodes may then, in turn determine via the storage service driver the one or more storage nodes that are implementing the storage for the targeted data page, and to route the redo log record(s) specifying that change to those storage nodes. The storage nodes may then be responsible for applying the change specified in the redo log record to the targeted data page at some point in the future. As writes are acknowledged back to the storage service driver, and then ultimately to the client-side driver, the client-side driver may advance the point at which the volume is durable and may acknowledge commits back to the database tier. As previously noted, in some embodiments, the client-side driver may not ever send data pages to the storage node servers. This may not only reduce network traffic, but may also remove the need for the checkpoint or background writer threads that constrain foreground-processing throughput in previous database systems.

In some embodiments, many read requests may be served by the database engine head node cache. For cache misses at the local head node cache, storage I/O read requests may be sent to one or more buffer cache nodes as determined by the client-side driver. However, write requests may require durability, since large-scale failure events may be too common to allow only in-memory replication. Therefore, the systems described herein may be configured to minimize the cost of the redo log record write operations that are in the foreground latency path by implementing data storage in the storage tier as two regions: a small append-only log-structured region into which redo log records are written when they are received from the database tier, and a larger region in which log records are coalesced together to create new versions of data pages in the background. In some embodiments, an in-memory structure may be maintained for each data page that points to the last redo log record for that page, backward chaining log records until an instantiated data block is referenced. This approach may provide good performance for mixed read-write workloads, including in applications in which reads are largely cached.

In some embodiments, because accesses to the log-structured data storage for the redo log records may consist of a series of sequential input/output operations (rather than random input/output operations), the changes being made may be tightly packed together. It should also be noted that, in contrast to existing systems in which each change to a data page results in two input/output operations to persistent data storage (one for the redo log and one for the modified data page itself), in some embodiments, the systems described herein may avoid this "write amplification" by coalescing data pages at the storage nodes of the distributed storage system based on receipt of the redo log records.

As previously noted, in some embodiments, the storage tier of the database system may be responsible for taking database snapshots. However, because the storage tier implements log-structured storage, taking a snapshot of a data page (e.g., a data block) may include recording a timestamp associated with the redo log record that was most recently applied to the data page/block (or a timestamp associated with the most recent operation to coalesce multiple redo log records to create a new version of the data page/block), and preventing garbage collection of the previous version of the page/block and any subsequent log entries up to the recorded point in time. In such embodiments, taking a database snapshot may not require reading, copying, or writing the data block, as would be required when employing an off-volume backup strategy. In some embodiments, the space requirements for snapshots may be minimal, since only modified data would require additional space, although user/subscribers may be able to choose how much additional space they want to keep for on-volume snapshots in addition to the active data set. In different embodiments, snapshots may be discrete (e.g., each snapshot may provide access to all of the data in a data page as of a specific point in time) or continuous (e.g., each snapshot may provide access to all versions of the data that existing in a data page between two points in time). In some embodiments, reverting to a prior snapshot may include recording a log record to indicate that all redo log records and data pages since that snapshot are invalid and garbage collectable, and discarding all database cache entries after the snapshot point. In such embodiments, no roll-forward may be required since the storage system will, on a block-by-block basis, apply redo log records to data blocks as requested and in the background across all nodes, just as it does in normal forward read/write processing. Crash recovery may thereby be made parallel and distributed across nodes.

Figure 3:
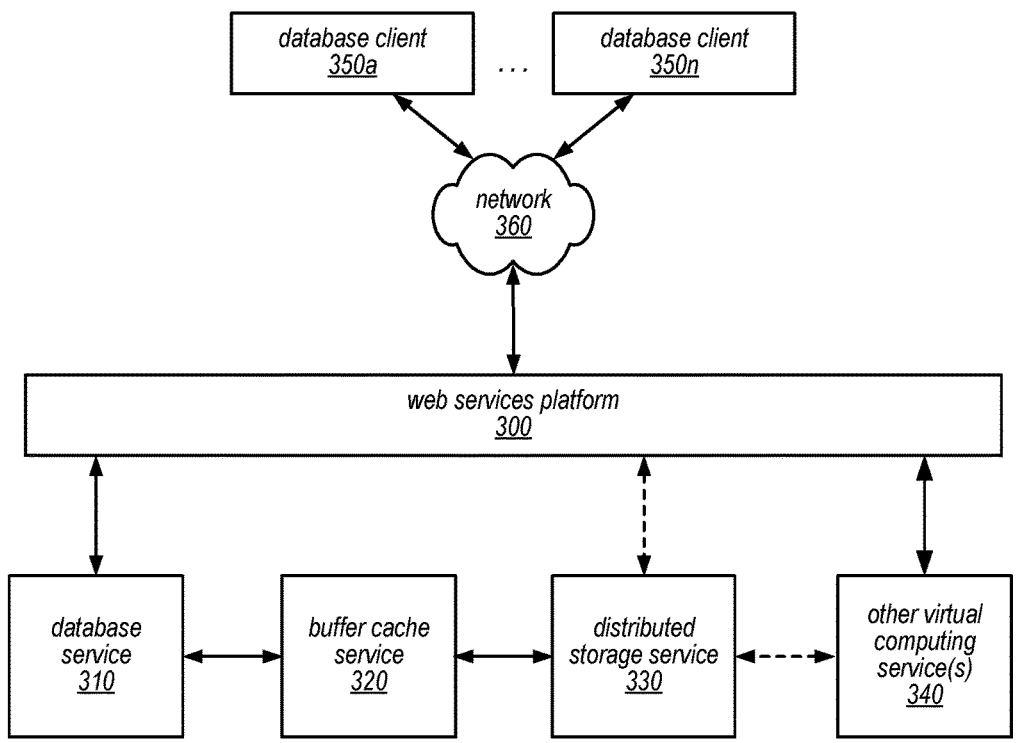
FIG. 3 is a block diagram illustrating the operating environment for various network-based services including a distributed buffer cache service, according to some embodiments.

One embodiment of a service system architecture that may be configured to implement a network-based database service, distributed buffer cache service, and distributed storage service is illustrated in FIG. 3. In the illustrated embodiment, a number of clients (shown as database clients 350*a*-350*n*) may be configured to interact with a network-based services platform 300 via a network 360. Network-based services platform 300 may be configured to interface with one or more instances of a database service 310, buffer cache service 320, distributed storage service 330, and/or one or more other virtual computing services 340. It is noted that where one or more instances of a given component may exist, reference to that component herein may be made in either the singular or the plural. However, usage of either form is not intended to preclude the other.

In various embodiments, the components illustrated in FIG. 3 may be implemented directly within computer hardware, as instructions directly or indirectly executable by computer hardware (e.g., a microprocessor or computer system), or using a combination of these techniques. For example, the components of FIG. 3 may be implemented by a system that includes a number of computing nodes (or simply, nodes), each of which may be similar to the computer system embodiment illustrated in FIG. 17 and described below. In various embodiments, the functionality of a given service system component (e.g., a component of the database service, component of the buffer cache service, or a component of the storage service) may be implemented by a particular node or may be distributed across several nodes. In some embodiments, a given node may implement the functionality of more than one service system component (e.g., more than one database service system component).

Generally speaking, clients 350 may encompass any type of client configurable to submit network-based services requests to network-based services platform 300 via network 360, including requests for database services (e.g., a request to generate a snapshot, etc.). For example, a given client 350 may include a suitable version of a web browser, or may include a plug-in module or other type of code module configured to execute as an extension to or within an execution environment provided by a web browser. Alternatively, a client 350 (e.g., a database service client) may encompass an application such as a database application (or user interface thereof), a media application, an office application or any other application that may make use of persistent storage resources to store and/or access one or more databases. In some embodiments, such an application may include sufficient protocol support (e.g., for a suitable version of Hypertext Transfer Protocol (HTTP)) for generating and processing web services requests without necessarily implementing full browser support for all types of web-based data. That is, client 350 may be an application configured to interact directly with network-based services platform 300. In some embodiments, client 350 may be configured to generate network-based services requests according to a Representational State Transfer (REST)-style web services architecture, a document- or message-based web services architecture, or another suitable web services architecture.

In some embodiments, a client 350 (e.g., a database service client) may be configured to provide access to network-based services-based storage of databases to other applications in a manner that is transparent to those applications. For example, client 350 may be configured to integrate with an operating system or file system to provide storage in accordance with a suitable variant of the storage models described herein. However, the operating system or file system may present a different storage interface to applications, such as a conventional file system hierarchy of files, directories and/or folders. In such an embodiment, applications may not need to be modified to make use of the storage system service model of FIG. 2. Instead, the details of interfacing to network-based services platform 300 may be coordinated by client 350 and the operating system or file system on behalf of applications executing within the operating system environment.

Clients 350 may convey web services requests (e.g., a snapshot request, parameters of a snapshot request, read request, restore a snapshot, etc.) to and receive responses from network-based services platform 300 via network 360. In various embodiments, network 360 may encompass any suitable combination of networking hardware and protocols necessary to establish network-based communications between clients 350 and platform 300. For example, network 260 may generally encompass the various telecommunications networks and service providers that collectively implement the Internet. Network 360 may also include private networks such as local area networks (LANs) or wide area networks (WANs) as well as public or private wireless networks. For example, both a given client 350 and network-based services platform 300 may be respectively provisioned within enterprises having their own internal networks. In such an embodiment, network 360 may include the hardware (e.g., modems, routers, switches, load balancers, proxy servers, etc.) and software (e.g., protocol stacks, accounting software, firewall/security software, etc.) necessary to establish a networking link between given client 350 and the Internet as well as between the Internet and network-based services platform 300. It is noted that in some embodiments, clients 350 may communicate with web services platform 300 using a private network rather than the public Internet. For example, clients 350 may be provisioned within the same enterprise as a database service system (e.g., a system that implements database service 310 and/or distributed storage service 320). In such a case, clients 350 may communicate with platform 300 entirely through a private network 360 (e.g., a LAN or WAN that may use Internet-based communication protocols but which is not publicly accessible).

Generally speaking, network-based services platform 300 may be configured to implement one or more service endpoints configured to receive and process network-based services requests, such as requests to access data pages (or records thereof). For example, network-based services platform 300 may include hardware and/or software configured to implement a particular endpoint, such that an HTTP-based web services request directed to that endpoint is properly received and processed. In one embodiment, network-based services platform 300 may be implemented as a server system configured to receive web services requests from clients 250 and to forward them to components of a system that implements database service 310, buffer cache service 320 (although not illustrated), distributed storage service 330 and/or another virtual computing service 340 for processing. In other embodiments, network-based services platform 300 may be configured as a number of distinct systems (e.g., in a cluster topology) implementing load balancing and other request management features configured to dynamically manage large-scale network-based services request processing loads. In various embodiments, network-based services platform 300 may be configured to support REST-style or document-based (e.g., SOAP-based) types of web services requests.

In addition to functioning as an addressable endpoint for clients' network-based services requests, in some embodiments, network-based services platform 300 may implement various client management features. For example, platform 300 may coordinate the metering and accounting of client usage of network-based services, including storage resources, such as by tracking the identities of requesting clients 350, the number and/or frequency of client requests, the size of data tables (or records thereof) stored or retrieved on behalf of clients 230, overall storage bandwidth used by clients 350, class of storage requested by clients 350, or any other measurable client usage parameter. Platform 300 may also implement financial accounting and billing systems, or may maintain a database of usage data that may be queried and processed by external systems for reporting and billing of client usage activity. In certain embodiments, platform 300 may be configured to collect, monitor and/or aggregate a variety of storage service system operational metrics, such as metrics reflecting the rates and types of requests received from clients 350, bandwidth utilized by such requests, system processing latency for such requests, system component utilization (e.g., network bandwidth and/or storage utilization within the storage service system), rates and types of errors resulting from requests, characteristics of stored and requested data pages or records thereof (e.g., size, data type, etc.), or any other suitable metrics. In some embodiments such metrics may be used by system administrators to tune and maintain system components, while in other embodiments such metrics (or relevant portions of such metrics) may be exposed to clients 350 to enable such clients to monitor their usage of database service 310, buffer cache service 320, distributed storage service 330 and/or another virtual computing service 340 (or the underlying systems that implement those services).

In some embodiments, platform 300 may also implement user authentication and access control procedures. For example, for a given network-based services request to access a particular database, platform 300 may be configured to ascertain whether the client 350 associated with the request is authorized to access the particular database. Platform 300 may determine such authorization by, for example, evaluating an identity, password or other credential against credentials associated with the particular database, or evaluating the requested access to the particular database against an access control list for the particular database. For example, if a client 350 does not have sufficient credentials to access the particular database, platform 300 may reject the corresponding network-based services request, for example by returning a response to the requesting client 350 indicating an error condition. Various access control policies may be stored as records or lists of access control information by database service 310, distributed storage service 330 and /or other virtual computing services 340.

It is noted that while network-based services platform 300 may represent the primary interface through which clients 350 may access the features of a database system that implements database service 310, it need not represent the sole interface to such features. For example, an alternate API that may be distinct from a network-based services interface may be used to allow clients internal to the enterprise providing the database system to bypass web services platform 300. Note that in many of the examples described herein, buffer cache service 320 and distributed storage service 3300 may be internal to a computing system or an enterprise system that provides database services to clients 350, and may not be exposed to external clients (e.g., users or client applications). In such embodiments, the internal "client" (e.g., database service 310) may access buffer cache service 320 and distributed storage service 330 over a local or private network, shown as the solid lines between distributed storage service 330 and buffer cache service 320, and between buffer cache service 320 and database service 310 (e.g., through an API directly between the systems that implement these services). In such embodiments, the use of distributed storage service 320 in storing databases on behalf of clients 350 may be transparent to those clients. In other embodiments, distributed storage service 220 may be exposed to clients 350 through network-based services platform 300 to provide storage of databases or other information for applications other than those that rely on database service 310 for database management. This is illustrated in FIG. 3 by the dashed line between network-based services platform 300 and distributed storage service 330. In such embodiments, clients of the distributed storage service 220 may access distributed storage service 220 via network 260 (e.g., over the Internet). In some embodiments, a virtual computing service 340 may be configured to receive storage services from distributed storage service 330 (e.g., through an API directly between the virtual computing service 340 and distributed storage service 330) to store objects used in performing computing services 340 on behalf of a client 350. This is illustrated in FIG. 3 by the dashed line between virtual computing service 340 and distributed storage service 330.

Figure 15:
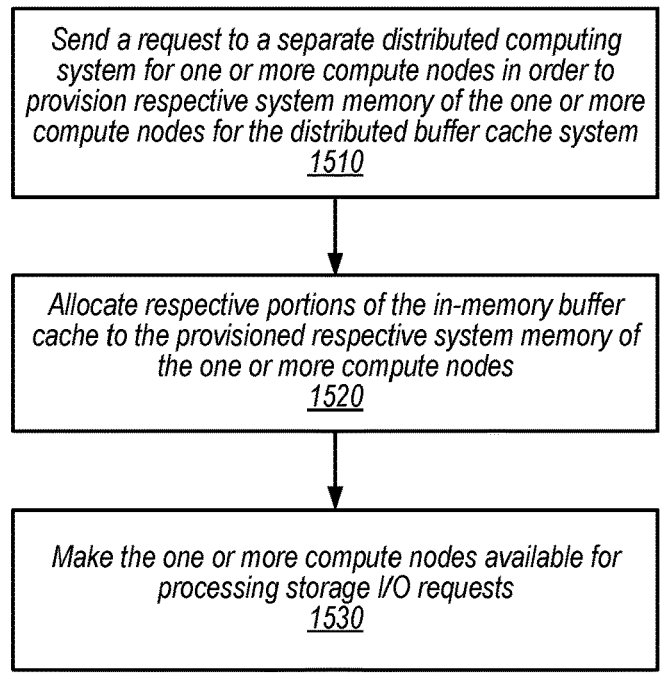
FIG. 15 is a high-level flowchart illustrating techniques for provisioning compute nodes from a separate distributed system for a distributed buffer cache system, according to some embodiments.
Figure 16:
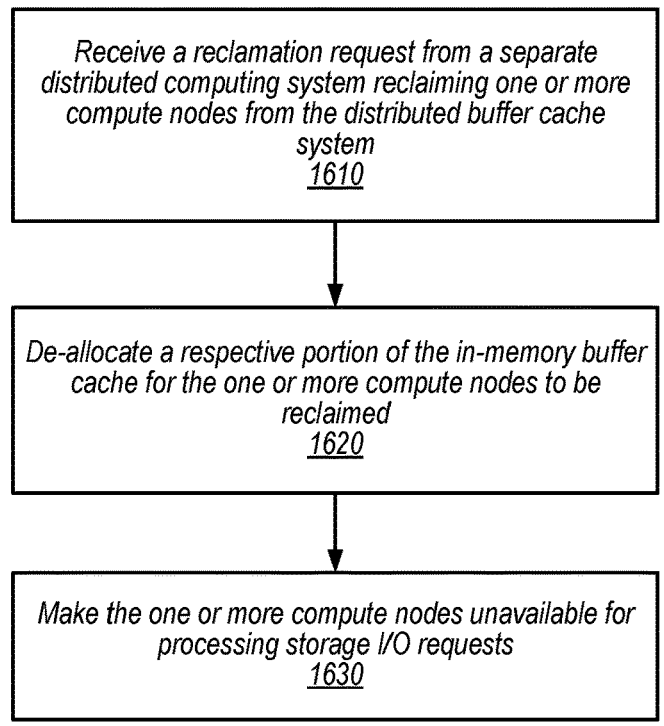
FIG. 16 is a high-level flowchart illustrating techniques for reclaiming provisioned compute nodes from a distributed buffer cache system for a separate distributed system, according to some embodiments.

Other virtual computing services 340 may provide resources such as may be provisioned by other services, such as buffer cache service 320. For example, buffer cache service 320 may request compute nodes from other compute services 340 in order to provide additional system memory for buffer cache service 320. FIGS. 15 and 16 discussed below provide further examples of the various techniques that may be implemented between distributed systems and buffer cache service 320. In some cases, the accounting and/or credentialing services of platform 300 may be unnecessary for internal clients such as administrative clients or between service components within the same enterprise.

Note that in various embodiments, different storage policies may be implemented by database service 310 and/or distributed storage service 330. Examples of such storage policies may include a durability policy (e.g., a policy indicating the number of instances of a database (or data page thereof) that will be stored and the number of different nodes on which they will be stored) and/or a load balancing policy (which may distribute databases, or data pages thereof, across different nodes, volumes and/or disks in an attempt to equalize request traffic). In addition, different storage policies may be applied to different types of stored items by various one of the services. For example, in some embodiments, distributed storage service 330 may implement a higher durability for redo log records than for data pages.

Figure 4:
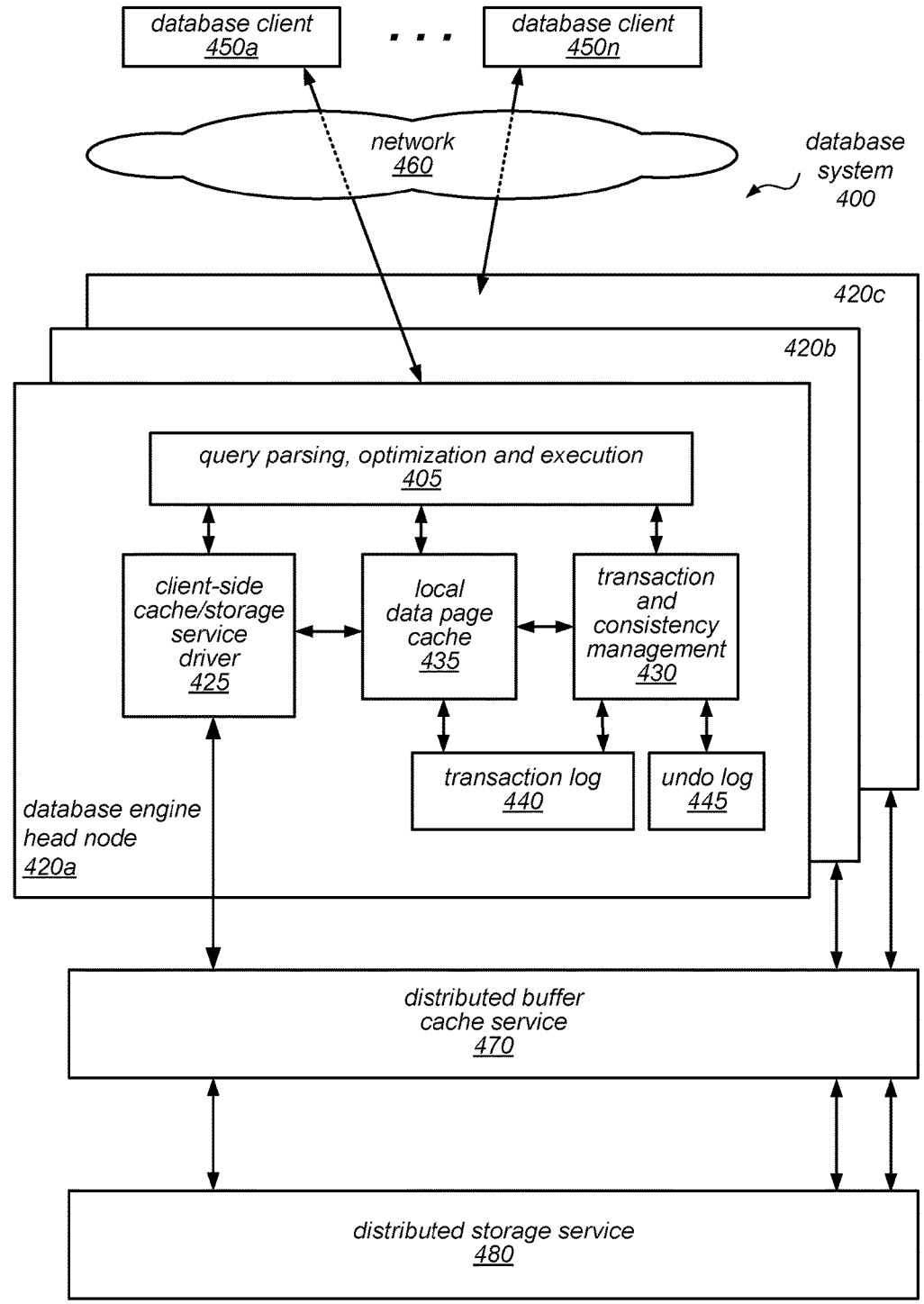
FIG. 4 is a block diagram illustrating various components of a database system that includes a database engine and a separate distributed buffer cache service and a separate distributed storage service, according to some embodiments.

FIG. 4 is a block diagram illustrating various components of a database system that includes a database engine, a separate distributed buffer cache service and a separate distributed database storage service, according to some embodiments. In this example, database system 400 includes a respective database engine head node 420 for each of several databases, a separate distributed buffer cache service 470 and a distributed storage service 480 (either of which may or may not be visible to the clients of the database system, shown as database clients 450a-450n). As illustrated in this example, one or more of database clients 450a-450n may access a database head node 420 (e.g., head node 420a, head node 420b, or head node 420c, each of which is a component of a respective database instance) via network 460 (e.g., these components may be network-addressable and accessible to the database clients 450a-450n). However, distributed storage service 480, which may be employed by the database system to store data pages of one or more databases (and redo log records and/or other metadata associated therewith) on behalf of database clients 450a-450n, and to perform other functions of the database system as described herein, may or may not be network-addressable and accessible to the storage clients 450a-450n, in different embodiments. For example, in some embodiments, distributed storage service 480 may perform various storage, access, change logging, recovery, log record manipulation, and/or space management operations in a manner that is invisible to storage clients 450a-450n. Distributed buffer cache service 470 may be implemented in addition to distributed storage service 480. Storage I/O requests (such as read requests or log records sent to be written to storage) may be first sent to distributed buffer cache service 470, which may in turn ensure that log records are then sent on to distributed storage service 480 to be persisted.

As previously noted, each database instance may include a single database engine head node 420 that receives requests (e.g., a snapshot request, etc.) from various client programs (e.g., applications) and/or subscribers (users), then parses them, optimizes them, and develops an execution plan to carry out the associated database operation(s). In the example illustrated in FIG. 4, a query parsing, optimization, and execution component 405 of database engine head node 420a may perform these functions for queries that are received from database client 450a and that target the database instance of which database engine head node 420a is a component. In some embodiments, query parsing, optimization, and execution component 405 may return query responses to database client 450a, which may include write acknowledgements, requested data pages (or portions thereof), error messages, and or other responses, as appropriate. As illustrated in this example, database engine head node 420a may also include a client-side cache/storage service driver 425, which may route read requests and/or redo log records to various buffer cache nodes in distributed buffer cache service 470 (and also storage nodes within distributed storage service 480), receive write acknowledgements from buffer cache service 470 (and also distributed storage service 480), receive requested data pages from distributed buffer cache service 470 (and also distributed storage service 480), and/or return data pages, error messages, or other responses to query parsing, optimization, and execution component 405 (which may, in turn, return them to database client 450a).

In this example, database engine head node 420a includes a local data page cache 435, in which data pages that were recently accessed may be temporarily held. Local data page cache may be limited to the amount of system memory available to database engine head node 420, and may be typically much smaller than the in-memory buffer caches maintained for database engine head node 420 at distributed buffer cache service 470. As illustrated in FIG. 4, database engine head node 420a may also include a transaction and consistency management component 430, which may be responsible for providing transactionality and consistency in the database instance of which database engine head node 420a is a component. For example, this component may be responsible for ensuring the Atomicity, Consistency, and Isolation properties of the database instance and the transactions that are directed that the database instance. As illustrated in FIG. 4, database engine head node 420a may also include a transaction log 440 and an undo log 445, which may be employed by transaction and consistency management component 430 to track the status of various transactions and roll back any locally cached results of transactions that do not commit.

Note that each of the other database engine head nodes 420 illustrated in FIG. 4 (e.g., 420b and 420c) may include similar components and may perform similar functions for queries received by one or more of database clients 450a-450n and directed to the respective database instances of which it is a component.

Figure 5:
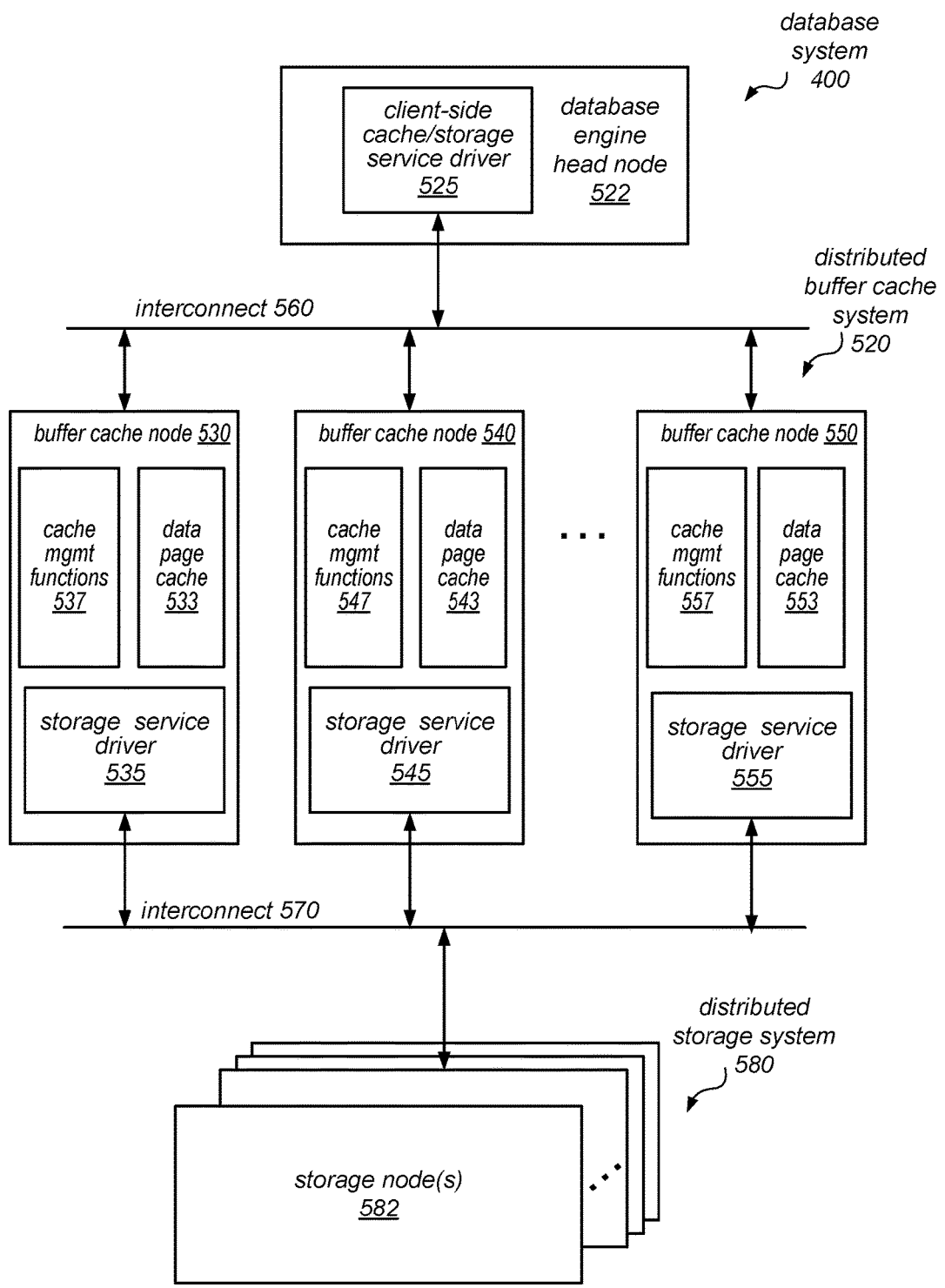
FIG. 5 is a block diagram illustrating various components of a distributed buffer cache system, according to some embodiments.

In some embodiments, distributed buffer cache service 470 may maintain one or more in-memory buffer caches for database engine head node 420. FIG. 5 is a block diagram illustrating various components of a distributed buffer cache system, according to some embodiments. Database engine head node 522 may implement client-side cache/storage service driver 525 which may, as discussed above, route log records and read requests for data pages to buffer cache nodes in distributed buffer cache system 520. These storage I/O requests may be sent over interconnect 560 to different ones of buffer cache nodes 530, 540, and 550 to which portion of the buffer cache, the buffer cache node maintains. Client-side cache/storage service driver 525 may implement the various methods and techniques described below with regard to FIGS. 10 and 11. For instance, a log record generated in response to an update to the database may be generate. Client-side cache/storage service driver 525 may send the storage I/O write request including the log record to a buffer cache node maintaining the data page in a buffer cache entry to which the log record is associated with. Similarly, client-side cache/storage service driver 525 may determine one or more buffer cache nodes 530, 540, or 550 to send a storage I/O read request for a data page. Client-side cache/storage service driver 525 may also be configured to determine if particular storage I/O operations are not performed within a time latency threshold, and in response to exceeding the time latency threshold, issue a storage I/O request directly to distributed storage system 580 (such as discussed below with regard to FIG. 12). Similarly, in the event of buffer cache node failures, client-side cache/storage service driver may be configured to directly communicate with distributed storage system 580 to perform various storage I/O requests.

Distributed buffer cache system 520 may implement multiple different buffer cache nodes, such as 530, 540, and 550. Buffer cache nodes may be any combination of hardware and/or software to maintain respective portions of an in-memory buffer cache for database engine head node 522. In some embodiments, each buffer cache node may implement a respective cache management functions modules, such as 537, 547, and 557, which may service storage I/O requests received from database engine head node. For example, cache management functions module 537 may maintain buffer cache metadata as to whether buffer cache entries are valid, invalid, dirty, write-in-progress, blocked, or otherwise unavailable for servicing read requests. Each buffer cache node may also implement a respective data page cache, such as data page cache 533, 543, and 553.

Each data page cache may be implemented in system memory local to the respective buffer cache node. As no one buffer cache node need contain all of the cached entries for data maintained in distributed storage system 580, adding or removing buffer cache nodes maintaining an in-memory buffer cache for database engine head node may allow for the database to be scaled to a size that effectively allows the database to operate in-memory (even if it is not in-memory locally at the database engine head node). In at least some embodiments, buffer cache nodes may be multi-tenant maintaining portions of different in-memory buffer caches in local system memory for different storage clients, such as different database engine head nodes, or another network-based service, such as other services 340 discussed above with regard to FIG. 3. In some embodiments, data stored in a same buffer cache node for different storage clients may be encrypted such that only a storage client may be able to decrypt/access data maintained for that storage client.

In some embodiments, each buffer cache node 530-550 may implement a storage service driver, 535, 545, and 555 respectively, which may be configured to communicate with storage nodes 582 in distributed storage system 580 (described in more detail with regard to FIGS. 6, 8, and 9) over interconnect 570. Storage service driver, as discussed above, may be configured to access data stored in the distributed storage system 580, perform various storage I/O requests, such as read and write requests, and determine whether a given write request is complete (e.g., that the log record is persisted durably at the distributed storage system). For example, in some embodiments, distributed storage system may be quorum-based, and storage service driver 535 may be configured to determine whether a log record sent as a storage I/O write request to storage nodes 582 has been acknowledged back by sufficient storage nodes to satisfy a write quorum requirement. Storage service drivers may also be configure to send back acknowledgments of complete writes to database engine head node 522. FIG. 7 below, as well as FIGS. 13 and 14, may describe additional techniques that may be implemented by the various components of a buffer cache node illustrated in FIG. 5.

Although not illustrated, distributed buffer cache system 520 may also implement a control plane module or service manager module that may manage the distributed buffer cache system. When additional nodes are added, or nodes dropped from the distributed buffer cache system 520, the service manager module may be configured to allocate portions of the in-memory buffer cache to other buffer cache nodes, as well as to new buffer cache nodes. Service manager module may be configured to implement the various techniques described below with regard to FIGS. 15 and 16, for provisioning compute nodes from other distributed systems to operate as buffer cache nodes in distributed buffer cache system 520, as well as handle processes for reclaiming buffer caches nodes. Service manager module may also be configured to deal with buffer cache node failure, notifying storage clients, such as database engine head node 522.

In some embodiments, the distributed storage systems described herein may organize data in various logical volumes, segments, and pages for storage on one or more storage nodes. For example, in some embodiments, each database is represented by a logical volume, and each logical volume is segmented over a collection of storage nodes. Each segment, which lives on a particular one of the storage nodes, contains a set of contiguous block addresses. In some embodiments, each data page is stored in a segment, such that each segment stores a collection of one or more data pages and a change log (also referred to as a redo log) (e.g., a log of redo log records) for each data page that it stores. As described in detail herein, the storage nodes may be configured to receive redo log records (which may also be referred to herein as ULRs) and to coalesce them to create new versions of the corresponding data pages and/or additional or replacement log records (e.g., lazily and/or in response to a request for a data page or a database crash). In some embodiments, data pages and/or change logs may be mirrored across multiple storage nodes, according to a variable configuration (which may be specified by the client on whose behalf the databases is being maintained in the database system). For example, in different embodiments, one, two, or three copies of the data or change logs may be stored in each of one, two, or three different availability zones or regions, according to a default configuration, an application-specific durability preference, or a client-specified durability preference.

As used herein, the following terms may be used to describe the organization of data by a distributed storage system, according to various embodiments.

Volume: A volume is a logical concept representing a highly durable unit of storage that a user/client/application of the storage system understands. More specifically, a volume is a distributed store that appears to the user/client/application as a single consistent ordered log of write operations to various user pages of a database. Each write operation may be encoded in a User Log Record (ULR), which represents a logical, ordered mutation to the contents of a single user page within the volume. As noted above, a ULR may also be referred to herein as a redo log record. Each ULR may include a unique identifier (e.g., a Logical Sequence Number (LSN)). Each ULR may be persisted to one or more synchronous segments in the distributed store that form a Protection Group (PG), to provide high durability and availability for the ULR. A volume may provide an LSN-type read/write interface for a variable-size contiguous range of bytes.

In some embodiments, a volume may consist of multiple extents, each made durable through a protection group. In such embodiments, a volume may represent a unit of storage composed of a mutable contiguous sequence of Volume Extents. Reads and writes that are directed to a volume may be mapped into corresponding reads and writes to the constituent volume extents. In some embodiments, the size of a volume may be changed by adding or removing volume extents from the end of the volume.

Segment: A segment is a limited-durability unit of storage assigned to a single storage node. More specifically, a segment provides limited best-effort durability (e.g., a persistent, but non-redundant single point of failure that is a storage node) for a specific fixed-size byte range of data. This data may in some cases be a mirror of user-addressable data, or it may be other data, such as volume metadata or erasure coded bits, in various embodiments. A given segment may live on exactly one storage node. Within a storage node, multiple segments may live on each SSD, and each segment may be restricted to one SSD (e.g., a segment may not span across multiple SSDs). In some embodiments, a segment may not be required to occupy a contiguous region on an SSD; rather there may be an allocation map in each SSD describing the areas that are owned by each of the segments. As noted above, a protection group may consist of multiple segments spread across multiple storage nodes. In some embodiments, a segment may provide an LSN-type read/write interface for a fixed-size contiguous range of bytes (where the size is defined at creation). In some embodiments, each segment may be identified by a Segment UUID (e.g., a universally unique identifier of the segment).

Storage page: A storage page is a block of memory, generally of fixed size. In some embodiments, each page is a block of memory (e.g., of virtual memory, disk, or other physical memory) of a size defined by the operating system, and may also be referred to herein by the term "data block". More specifically, a storage page may be a set of contiguous sectors. It may serve as the unit of allocation in SSDs, as well as the unit in log pages for which there is a header and metadata. In some embodiments, and in the context of the database systems described herein, the term "page" or "storage page" may refer to a similar block of a size defined by the database configuration, which may typically a multiple of 2, such as 4096, 8192, 16384, or 32768 bytes.

Log page: A log page is a type of storage page that is used to store log records (e.g., redo log records or undo log records). In some embodiments, log pages may be identical in size to storage pages. Each log page may include a header containing metadata about that log page, e.g., metadata identifying the segment to which it belongs. Note that a log page is a unit of organization and may not necessarily be the unit of data included in write operations. For example, in some embodiments, during normal forward processing, write operations may write to the tail of the log one sector at a time.

Log Records: Log records (e.g., the individual elements of a log page) may be of several different classes. For example, User Log Records (ULRs), which are created and understood by users/clients/applications of the storage system, may be used to indicate changes to user data in a volume. Control Log Records (CLRs), which are generated by the storage system, may contain control information used to keep track of metadata such as the current unconditional volume durable LSN (VDL). Null Log Records (NLRs) may in some embodiments be used as padding to fill in unused space in a log sector or log page. In some embodiments, there may be various types of log records within each of these classes, and the type of a log record may correspond to a function that needs to be invoked to interpret the log record. For example, one type may represent all the data of a user page in compressed format using a specific compression format; a second type may represent new values for a byte range within a user page; a third type may represent an increment operation to a sequence of bytes interpreted as an integer; and a fourth type may represent copying one byte range to another location within the page. In some embodiments, log record types may be identified by GUIDs (rather than by integers or enums), which may simplify versioning and development, especially for ULRs.

Payload: The payload of a log record is the data or parameter values that are specific to the log record or to log records of a particular type. For example, in some embodiments, there may be a set of parameters or attributes that most (or all) log records include, and that the storage system itself understands. These attributes may be part of a common log record header/structure, which may be relatively small compared to the sector size. In addition, most log records may include additional parameters or data specific to that log record type, and this additional information may be considered the payload of that log record. In some embodiments, if the payload for a particular ULR is larger than the user page size, it may be replaced by an absolute ULR (an AULR) whose payload includes all the data for the user page. This may enable the storage system to enforce an upper limit on the size of the payload for ULRs that is equal to the size of user pages.

Note that when storing log records in the segment log, the payload may be stored along with the log header, in some embodiments. In other embodiments, the payload may be stored in a separate location, and pointers to the location at which that payload is stored may be stored with the log header. In still other embodiments, a portion of the payload may be stored in the header, and the remainder of the payload may be stored in a separate location. If the entire payload is stored with the log header, this may be referred to as in-band storage; otherwise the storage may be referred to as being out-of-band. In some embodiments, the payloads of most large AULRs may be stored out-of-band in the cold zone of log (which is described below).

User pages: User pages are the byte ranges (of a fixed size) and alignments thereof for a particular volume that are visible to users/clients of the storage system. User pages are a logical concept, and the bytes in particular user pages may or not be stored in any storage page as-is. The size of the user pages for a particular volume may be independent of the storage page size for that volume. In some embodiments, the user page size may be configurable per volume, and different segments on a storage node may have different user page sizes. In some embodiments, user page sizes may be constrained to be a multiple of the sector size (e.g., 4 KB), and may have an upper limit (e.g., 64 KB). The storage page size, on the other hand, may be fixed for an entire storage node and may not change unless there is a change to the underlying hardware.

Data page: A data page is a type of storage page that is used to store user page data in compressed form. In some embodiments every piece of data stored in a data page is associated with a log record, and each log record may include a pointer to a sector within a data page (also referred to as a data sector). In some embodiments, data pages may not include any embedded metadata other than that provided by each sector. There may be no relationship between the sectors in a data page. Instead, the organization into pages may exist only as an expression of the granularity of the allocation of data to a segment.

Storage node: A storage node is a single virtual machine that on which storage node server code is deployed. Each storage node may contain multiple locally attached SSDs, and may provide a network API for access to one or more segments. In some embodiments, various nodes may be on an active list or on a degraded list (e.g., if they are slow to respond or are otherwise impaired, but are not completely unusable). In some embodiments, the client-side driver may assist in (or be responsible for) classifying nodes as active or degraded, for determining if and when they should be replaced, and/or for determining when and how to redistribute data among various nodes, based on observed performance.

SSD: As referred to herein, the term "SSD" may refer to a local block storage volume as seen by the storage node, regardless of the type of storage employed by that storage volume, e.g., disk, a solid-state drive, a battery-backed RAM, a non-volatile RAM device (e.g., one or more NV-DIMMs) or another type of persistent storage device. An SSD is not necessarily mapped directly to hardware. For example, a single solid-state storage device might be broken up into multiple local volumes where each volume is split into and striped across multiple segments, and/or a single drive may be broken up into multiple volumes simply for ease of management, in different embodiments. In some embodiments, each SSD may store an allocation map at a single fixed location. This map may indicate which storage pages that are owned by particular segments, and which of these pages are log pages (as opposed to data pages). In some embodiments, storage pages may be pre-allocated to each segment so that forward processing may not need to wait for allocation. Any changes to the allocation map may need to be made durable before newly allocated storage pages are used by the segments.

Figure 6:
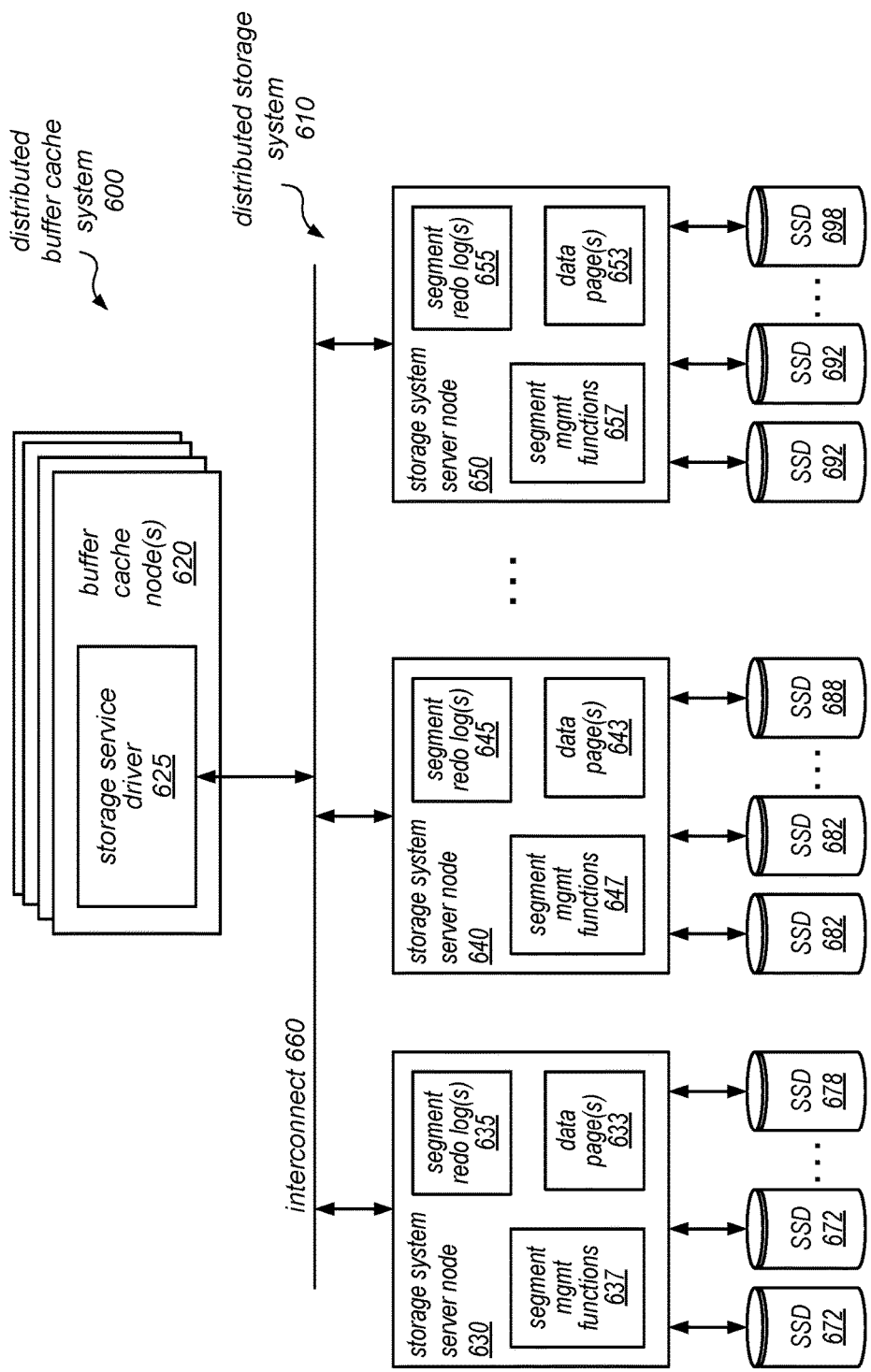
FIG. 6 is a block diagram illustrating various components of a distributed storage system, according to some embodiments.
Figure 7:
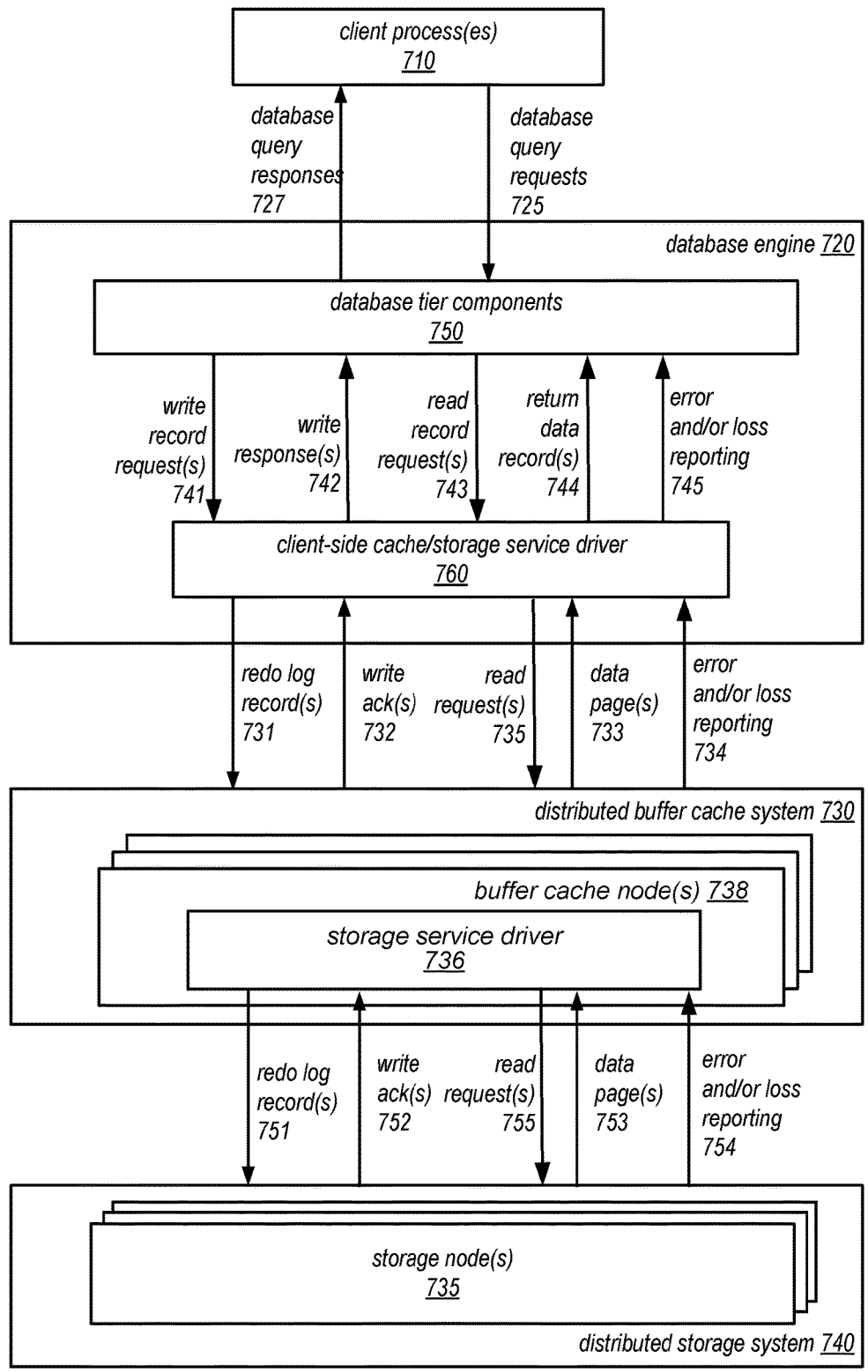
FIG. 7 is a block diagram illustrating the use of a separate distributed buffer cache system in a database system using a separate distributed storage service, according to some embodiments.

One embodiment of a distributed storage system is illustrated by the block diagram in FIG. 6. In this example, a database system may implement a separate distributed buffer cache system 600 that communicates storage I/O requests to distributed storage system 610, which communicates with buffer cache nodes 620 over interconnect 660. As in the example illustrated in FIG. 5, buffer cache nodes 60 may include a storage service driver 625. In this example, distributed storage system 610 includes multiple storage system server nodes (including those shown as 630, 640, and 650), each of which includes storage for data pages and redo logs for the segment(s) it stores, and hardware and/or software configured to perform various segment management functions. For example, each storage system server node may include hardware and/or software configured to perform at least a portion of any or all of the following operations: replication (locally, e.g., within the storage node), coalescing of redo logs to generate data pages, snapshots (e.g., creating, restoration, deletion, etc.), log management (e.g., manipulating log records), crash recovery, and/or space management (e.g., for a segment). Each storage system server node may also have multiple attached storage devices (e.g., SSDs) on which data blocks may be stored on behalf of clients (e.g., users, client applications, and/or database service subscribers).

In the example illustrated in FIG. 6, storage system server node 630 includes data page(s) 633, segment redo log(s) 635, segment management functions 637, and attached SSDs 671-678. Again note that the label "SSD" may or may not refer to a solid-state drive, but may more generally refer to a local block storage volume, regardless of its underlying hardware. Similarly, storage system server node 640 includes data page(s) 643, segment redo log(s) 645, segment management functions 647, and attached SSDs 681-688; and storage system server node 650 includes data page(s) 653, segment redo log(s) 655, segment management functions 657, and attached SSDs 691-698.

As previously noted, in some embodiments, a sector is the unit of alignment on an SSD and may be the maximum size on an SSD that can be written without the risk that the write will only be partially completed. For example, the sector size for various solid-state drives and spinning media may be 4 KB. In some embodiments of the distributed storage systems described herein, each and every sector may include have a 64-bit (8 byte) CRC at the beginning of the sector, regardless of the higher-level entity of which the sector is a part. In such embodiments, this CRC (which may be validated every time a sector is read from SSD) may be used in detecting corruptions. In some embodiments, each and every sector may also include a "sector type" byte whose value identifies the sector as a log sector, a data sector, or an uninitialized sector. For example, in some embodiments, a sector type byte value of 0 may indicate that the sector is uninitialized.

In some embodiments, each of the storage system server nodes in the distributed storage system may implement a set of processes running on the node server's operating system that manage communication with the buffer cache nodes and/or the database engine head node, e.g., to receive redo logs, send back data pages, etc. In some embodiments, all data blocks written to the distributed storage system may be backed up to long-term and/or archival storage (e.g., in a remote key-value durable backup storage system).

FIG. 7 is a block diagram illustrating the use of a separate distributed buffer cache system in a database system using a separate distributed storage service, according to some embodiments. In this example, one or more client processes 710 may store data to one or more databases maintained by a database system that includes a database engine 720, a separate distributed buffer cache system 730, and a distributed storage system 740. In the example illustrated in FIG. 7, database engine 720 includes database tier components 750 and client-side cache/storage service driver 760 (which serves as the interface between distributed buffer cache system 730, distributed storage system 740 and database tier components 750). In some embodiments, database tier components 750 may perform functions such as those performed by query parsing, optimization and execution component 405 and transaction and consistency management component 430 of FIG. 4, and/or may store data pages, transaction logs and/or undo logs (such as those stored by data page cache 435, transaction log 440 and undo log 445 of FIG. 4).

In this example, one or more client processes 710 may send database query requests 725 (which may include read and/or write requests targeting data stored on one or more of the storage nodes 735) to database tier components 750, and may receive database query responses 727 from database tier components 750 (e.g., responses that include write acknowledgements and/or requested data). Each database query request 725 that includes a request to write to a data page may be parsed and optimized to generate one or more write record requests 741, which may be sent to client-side cache/storage service driver 760 for subsequent routing to distributed buffer cache system 730. In this example, client-side driver 760 may generate one or more redo log records 731 corresponding to each write record request 741, and may send them to specific ones of the buffer cache nodes 738 of distributed buffer cache system 730. Buffer cache nodes 738 may identify buffer cache entries as write in progress, dirty, or otherwise unavailable for reads, and send via storage service driver 736 redo log records 751 to specific ones of storage nodes 735 in distributed storage system 740. Distributed storage system 740 may return a corresponding write acknowledgement 752 for each redo log record 751 to buffer cache nodes 738 (specifically to storage service driver 736). Buffer cache nodes may determine based on the acknowledgments that the log record is durably persisted at distributed storage system 740, and send write ack(s) 732 for each log record to database engine 720 (specifically to client-side cache/storage service driver 760). Client-side driver 760 may pass these write acknowledgements to database tier components 750 (as write responses 742), which may then send corresponding responses (e.g., write acknowledgements) to one or more client processes 710 as one of database query responses 727.

In this example, each database query request 725 that includes a request to read a data page may be parsed and optimized to generate one or more read record requests 743, which may be sent to client-side driver 760 for subsequent routing to distributed buffer cache system 730. In this example, client-side driver 760 may send read requests 735 to specific buffer cache nodes 738 in distributed buffer cache system 730. If the buffer node has a valid buffer cache entry (a hit), then the requested data pages 733 may be returned to client-side/cache storage service drive. If the buffer cache node has an invalid cache entry (e.g., a miss, write-in-progress, or unavailable storage node), then storage service driver 736 for a buffer cache node 738 may send a read request 755 to specific storage nodes 735, which may return the requested data page 753. Buffer cache nodes may then update the respective buffer cache entries with the data pages and send data pages 733 to client-side driver 760. Client-side driver 760 may send the returned data pages to the database tier components 750 as return data records 744, and database tier components 750 may then send the data pages to one or more client processes 710 as database query responses 727.

In some embodiments, various error and/or data loss messages 754 may be sent from distributed storage system 740 to buffer cache nodes 738, which may in turn forward the error and/or loss reporting 734 to database engine 720 (specifically to client-side driver 760). These messages may be passed from client-side driver 760 to database tier components 750 as error and/or loss reporting messages 745, and then to one or more client processes 710 along with (or instead of) a database query response 7277.

In some embodiments, the APIs for the various messages and requests between distributed storage system 740, distributed buffer cache system 730, and client-side driver 760 of database engine 720 may expose the functionality of the distributed buffer cache system 730, and the distributed storage system 740 to database engine 720 as if database engine 720 were a client of distributed storage system 740 and distributed buffer cache system 730. For example, database engine 720 (through client-side driver 760) may write redo log records or request data pages through these APIs to perform (or facilitate the performance of) various operations of the database system implemented by the combination of database engine 720, distributed buffer cache system 730 (e.g., storage I/O requests) and distributed storage system 740 (e.g., storage, access, change logging, recovery, and/or space management operations). Distributed storage system 740 may store data blocks on storage nodes 745, each of which may have multiple attached SSDs. In some embodiments, distributed storage system 740 may provide high durability for stored data block through the application of various types of redundancy schemes. Various other techniques, such as the different methods discussed below with regard to FIGS. 10-14 may be implemented by the various different components illustrated in FIG. 7.

Note that in various embodiments, the API calls and responses between database engine 720, distributed buffer cache system 730, and distributed storage system 740 and/or the API calls and responses between client-side driver 760 and database tier components 750 in FIG. 7 may be performed over a secure proxy connection (e.g., one managed by a gateway control plane), or may be performed over the public network or, alternatively, over a private channel such as a virtual private network (VPN) connection. These and other APIs to and/or between components of the database systems described herein may be implemented according to different technologies, including, but not limited to, Simple Object Access Protocol (SOAP) technology and Representational state transfer (REST) technology. For example, these APIs may be, but are not necessarily, implemented as SOAP APIs or RESTful APIs. SOAP is a protocol for exchanging information in the context of Web-based services. REST is an architectural style for distributed hypermedia systems. A RESTful API (which may also be referred to as a RESTful web service) is a web service API implemented using HTTP and REST technology. The APIs described herein may in some embodiments be wrapped with client libraries in various languages, including, but not limited to, C, C++, Java, C# and Perl to support integration with database engine 720, and/or distributed buffer cache system 730, and/or distributed storage system 740.

As noted above, in some embodiments, the functional components of a database system may be partitioned between those that are performed by the database engine and those that are performed in a separate, distributed buffer cache system, and distributed, storage system. In one specific example, in response to receiving a request from a client process (or a thread thereof) to insert something into a database (e.g., to update a single data block by adding a record to that data block), one or more components of the database engine head node may perform query parsing, optimization, and execution, and may send each portion of the query to a transaction and consistency management component. The transaction and consistency management component may ensure that no other client process (or thread thereof) is trying to modify the same row at the same time. For example, the transaction and consistency management component may be responsible for ensuring that this change is performed atomically, consistently, durably, and in an isolated manner in the database. For example, the transaction and consistency management component may work together with the client-side storage service driver of the database engine head node to generate a redo log record to be sent to one of the nodes in the distributed buffer cache system, which may perform write through caching and send the redo log record to one or more storage nodes in the distributed storage service and to send it to the distributed storage service (along with other redo logs generated in response to other client requests) in an order and/or with timing that ensures the ACID properties are met for this transaction. Upon receiving the redo log record (which may be considered an "update record" by the storage service), the corresponding storage node may update the data block, and may update a redo log for the data block (e.g., a record of all changes directed to the data block). In some embodiments, the database engine may be responsible for generating an undo log record for this change, and may also be responsible for generating a redo log record for the undo log both of which may be used locally (in the database tier) for ensuring transactionality. However, unlike in traditional database systems, the systems described herein may shift the responsibility for applying changes to data blocks to the storage system (rather than applying them at the database tier and shipping the modified data blocks to the storage system).

A variety of different allocation models may be implemented for an SSD, in different embodiments. For example, in some embodiments, log entry pages and physical application pages may be allocated from a single heap of pages associated with an SSD device. This approach may have the advantage of leaving the relative amount of storage consumed by log pages and data pages to remain unspecified and to adapt automatically to usage. It may also have the advantage of allowing pages to remain unprepared until they are used, and repurposed at will without preparation.

In other embodiments, an allocation model may partition the storage device into separate spaces for log entries and data pages. Once such allocation model is illustrated by the block diagram in FIG. 8 and described below.

Figure 8:
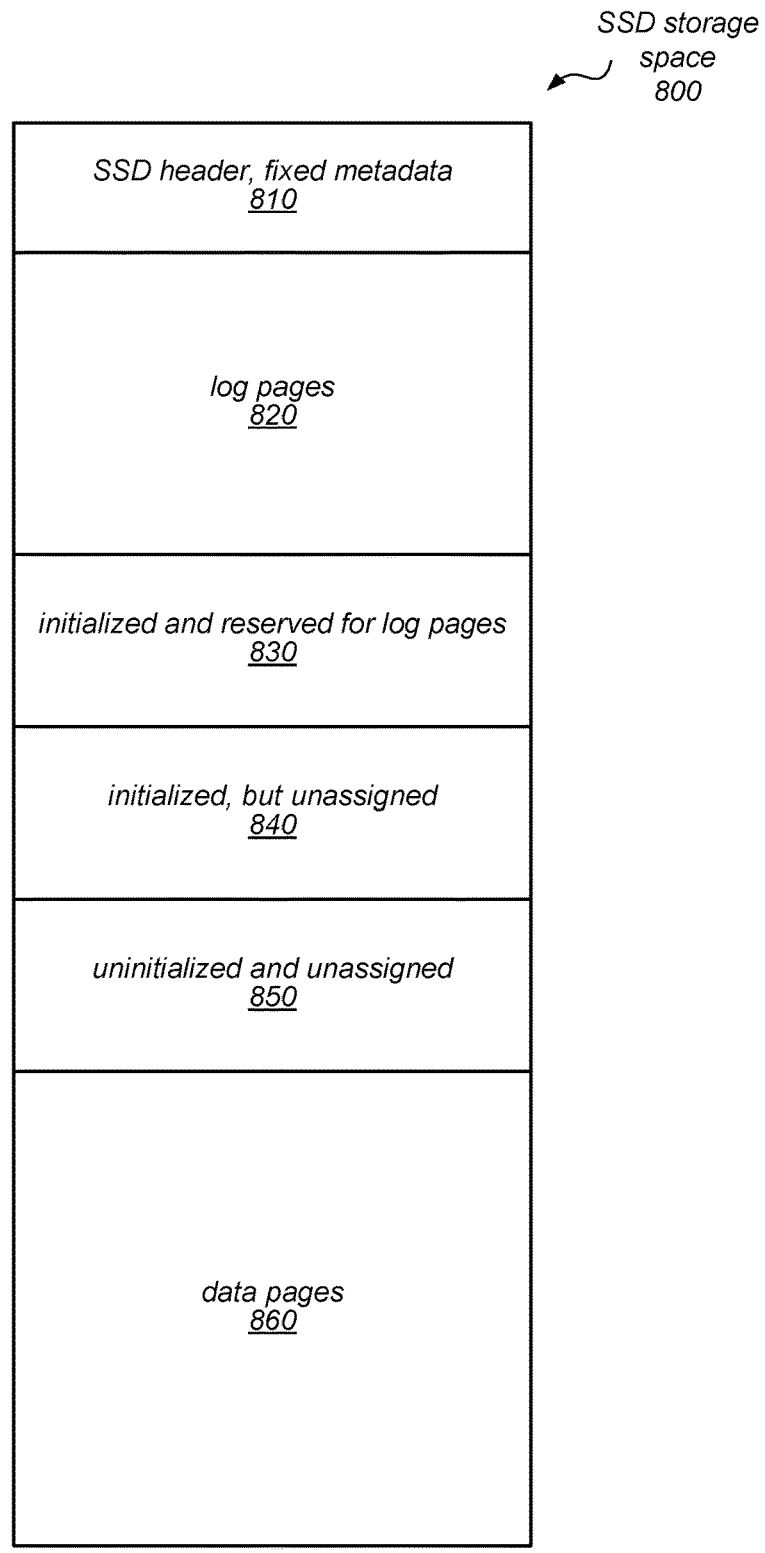
FIG. 8 is a block diagram illustrating how data and metadata may be stored on a given node of a distributed storage system, according to one embodiment.

FIG. 8 is a block diagram illustrating how data and metadata may be stored on a given storage node (or persistent storage device) of a distributed storage system, according to one embodiment. In this example, SSD storage space 800 stores an SSD header and other fixed metadata in the portion of the space labeled 810. It stores log pages in the portion of the space labeled 820, and includes a space labeled 830 that is initialized and reserved for additional log pages. One portion of SSD storage space 800 (shown as 840) is initialized, but unassigned, and another portion of the space (shown as 850) is uninitialized and unassigned. Finally, the portion of SSD storage space 800 labeled 860 stores data pages.

In allocation approach illustrated in FIG. 8, valid log pages may be packed into the beginning of the flat storage space. Holes that open up due to log pages being freed may be reused before additional log page slots farther into the address space are used. For example, in the worst case, the first n log page slots contain valid log data, where n is the largest number of valid log pages that have ever simultaneously existed. In this example, valid data pages may be packed into the end of the flat storage space. Holes that open up due to data pages being freed may be reused before additional data page slots lower in the address space are used. For example, in the worst case, the last m data pages contain valid data, where m is the largest number of valid data pages that have ever simultaneously existed.

In some embodiments, before a log page slot can become part of the potential set of valid log page entries, it may need to be initialized to a value that cannot be confused for a valid future log entry page. This is implicitly true for recycled log page slots, since a retired log page has enough metadata to never be confused for a new valid log page. However, when a storage device is first initialized, or when space is reclaimed that had potentially been used to store application data pages, the log page slots may need to be initialized before they are added to the log page slot pool. In some embodiments, rebalancing/reclaiming log space may be performed as a background task.

In the example illustrated in FIG. 8, the current log page slot pool includes the area between the first usable log page slot and the last reserved log page slot. In some embodiments, this pool may safely grow up to last usable log page slot without re-initialization of new log page slots (e.g., by persisting an update to the pointer that identifies the last reserved log page slot). In this example, beyond the last usable log page slot (which is identified by pointer), the pool may grow up to the first used data page slot (which is identified by pointer) by persisting initialized log page slots and persistently updating the pointer for the last usable log page slot. In this example, the previously uninitialized and unassigned portion of the SSD storage space 800 shown as 850 may be pressed into service to store log pages. In some embodiments, the current log page slot pool may be shrunk down to the position of the last used log page slot (which is identified by pointer) by persisting an update to the pointer for the last reserved log page slot.

In the example illustrated in FIG. 8, the current data page slot pool includes the area between the last usable log page slot (which is identified by pointer) and the end of SSD storage space 800. In some embodiments, the data page pool may be safely grown to the position identified by the pointer to the last reserved log page slot by persisting an update to the pointer to the last usable log page slot . In this example, the previously initialized, but unassigned portion of the SSD storage space 800 shown as 840 may be pressed into service to store data pages. Beyond this, the pool may be safely grown to the position identified by the pointer to the last used log page slot by persisting updates to the pointers for the last reserved log page slot and the last usable log page slot, effectively reassigning the portions of SSD storage space 800 shown as 830 and 840 to store data pages, rather than log pages. In some embodiments, the data page slot pool may be safely shrunk down to the position identified by the pointer to the first used data page slot by initializing additional log page slots and persisting an update to the pointer to the last usable log page slot.

In embodiments that employ the allocation approach illustrated in FIG. 8, page sizes for the log page pool and the data page pool may be selected independently, while still facilitating good packing behavior. In such embodiments, there may be no possibility of a valid log page linking to a spoofed log page formed by application data, and it may be possible to distinguish between a corrupted log and a valid log tail that links to an as-yet-unwritten next page. In embodiments that employ the allocation approach illustrated in FIG. 8, at startup, all of the log page slots up to the position identified by the pointer to the last reserved log page slot may be rapidly and sequentially read, and the entire log index may be reconstructed (including inferred linking/ordering). In such embodiments, there may be no need for explicit linking between log pages, since everything can be to inferred from LSN sequencing constraints.

In some embodiments, a segment may consist of three main parts (or zones): one that contains a hot log, one that contains a cold log, and one that contains user page data. Zones are not necessarily contiguous regions of an SSD. Rather, they can be interspersed at the granularity of the storage page. In addition, there may be a root page for each segment that stores metadata about the segment and its properties. For example, the root page for a segment may store the user page size for the segment, the number of user pages in the segment, the current beginning/head of the hot log zone (which may be recorded in the form of a flush number), the volume epoch, and/or access control metadata.

In some embodiments, the hot log zone may accept new writes from the client as they are received by the storage node. Both Delta User Log Records (DULRs), which specify a change to a user/data page in the form of a delta from the previous version of the page, and Absolute User Log Records (AULRs), which specify the contents of a complete user/data page, may be written completely into the log. Log records may be added to this zone in approximately the order they are received (e.g., they are not sorted by LSN) and they can span across log pages. The log records may be self-describing, e.g., they may contain an indication of their own size. In some embodiments, no garbage collection is performed in this zone. Instead, space may be reclaimed by truncating from the beginning of the log after all required log records have been copied into the cold log. Log sectors in the hot zone may be annotated with the most recent known unconditional VDL each time a sector is written. Conditional VDL CLRs may be written into the hot zone as they are received, but only the most recently written VDL CLR may be meaningful.

In some embodiments, every time a new log page is written, it may be assigned a flush number. The flush number may be written as part of every sector within each log page. Flush numbers may be used to determine which log page was written later when comparing two log pages. Flush numbers are monotonically increasing and scoped to an SSD (or storage node). For example, a set of monotonically increasing flush numbers is shared between all segments on an SSD (or all segments on a storage node).

In some embodiments, in the cold log zone, log records may be stored in increasing order of their LSNs. In this zone, AULRs may not necessarily store data in-line, depending on their size. For example, if they have large payloads, all or a portion of the payloads may be stored in the data zone and they may point to where their data is stored in the data zone. In some embodiments, log pages in the cold log zone may be written one full page at a time, rather than sector-by-sector. Because log pages in the cold zone are written a full page at a time, any log page in the cold zone for which the flush numbers in all sectors are not identical may be considered to be an incompletely written page and may be ignored. In some embodiments, in the cold log zone, DULRs may be able to span across log pages (up to a maximum of two log pages). However, AULRs may not be able to span log sectors, e.g., so that a coalesce operation will be able to replace a DULR with an AULR in a single atomic write.

In some embodiments, the cold log zone is populated by copying log records from the hot log zone. In such embodiments, only log records whose LSN is less than or equal to the current unconditional volume durable LSN (VDL) may be eligible to be copied to the cold log zone. When moving log records from the hot log zone to the cold log zone, some log records (such as many CLRs) may not need to be copied because they are no longer necessary. In addition, some additional coalescing of user pages may be performed at this point, which may reduce the amount of copying required. In some embodiments, once a given hot zone log page has been completely written and is no longer the newest hot zone log page, and all ULRs on the hot zone log page have been successfully copied to the cold log zone, the hot zone log page may be freed and reused.

In some embodiments, garbage collection may be done in the cold log zone to reclaim space occupied by obsolete log records, e.g., log records that no longer need to be stored in the SSDs of the storage tier. For example, a log record may become obsolete when there is a subsequent AULR for the same user page and the version of the user page represented by the log record is not needed for retention on SSD. In some embodiments, a garbage collection process may reclaim space by merging two or more adjacent log pages and replacing them with fewer new log pages containing all of the non-obsolete log records from the log pages that they are replacing. The new log pages may be assigned new flush numbers that are larger than the flush numbers of the log pages they are replacing. After the write of these new log pages is complete, the replaced log pages may be added to the free page pool. Note that in some embodiments, there may not be any explicit chaining of log pages using any pointers. Instead, the sequence of log pages may be implicitly determined by the flush numbers on those pages. Whenever multiple copies of a log record are found, the log record present in the log page with highest flush number may be considered to be valid and the others may be considered to be obsolete.

In some embodiments, e.g., because the granularity of space managed within a data zone (sector) may be different from the granularity outside the data zone (storage page), there may be some fragmentation. In some embodiments, to keep this fragmentation under control, the system may keep track of the number of sectors used by each data page, may preferentially allocate from almost-full data pages, and may preferentially garbage collect almost-empty data pages (which may require moving data to a new location if it is still relevant). Note that pages allocated to a segment may in some embodiments be repurposed among the three zones. For example, when a page that was allocated to a segment is freed, it may remain associated with that segment for some period of time and may subsequently be used in any of the three zones of that segment. The sector header of every sector may indicate the zone to which the sector belongs. Once all sectors in a page are free, the page may be returned to a common free storage page pool that is shared across zones. This free storage page sharing may in some embodiments reduce (or avoid) fragmentation.

In some embodiments, the distributed storage systems described herein may maintain various data structures in memory. For example, for each user page present in a segment, a user page table may store a bit indicating whether or not this user page is "cleared" (i.e., whether it includes all zeroes), the LSN of the latest log record from the cold log zone for the page, and an array/list of locations of all log records from the hot log zone for page. For each log record, the user page table may store the sector number, the offset of the log record within that sector, the number of sectors to read within that log page, the sector number of a second log page (if the log record spans log pages), and the number of sectors to read within that log page. In some embodiments, the user page table may also store the LSNs of every log record from the cold log zone and/or an array of sector numbers for the payload of the latest AULR if it is in the cold log zone.

In some embodiments of the distributed storage systems described herein, an LSN index may be stored in memory. An LSN index may map LSNs to log pages within the cold log zone.

Given that log records in cold log zone are sorted, it may be to include one entry per log page. However, in some embodiments, every non-obsolete LSN may be stored in the index and mapped to the corresponding sector numbers, offsets, and numbers of sectors for each log record.

In some embodiments of the distributed storage systems described herein, a log page table may be stored in memory, and the log page table may be used during garbage collection of the cold log zone. For example, the log page table may identify which log records are obsolete (e.g., which log records can be garbage collected) and how much free space is available on each log page.

In the storage systems described herein, an extent may be a logical concept representing a highly durable unit of storage that can be combined with other extents (either concatenated or striped) to represent a volume. Each extent may be made durable by membership in a single protection group. An extent may provide an LSN-type read/write interface for a contiguous byte sub-range having a fixed size that is defined at creation. Read/write operations to an extent may be mapped into one or more appropriate segment read/write operations by the containing protection group. As used herein, the term "volume extent" may refer to an extent that is used to represent a specific sub-range of bytes within a volume.

As noted above, a volume may consist of multiple extents, each represented by a protection group consisting of one or more segments. In some embodiments, log records directed to different extents may have interleaved LSNs. For changes to the volume to be durable up to a particular LSN it may be necessary for all log records up to that LSN to be durable, regardless of the extent to which they belong. In some embodiments, the client may keep track of outstanding log records that have not yet been made durable, and once all ULRs up to a specific LSN are made durable, it may send a Volume Durable LSN (VDL) message to one of the protection groups in the volume. The VDL may be written to all synchronous mirror segments for the protection group. This is sometimes referred to as an "Unconditional VDL" and it may be periodically persisted to various segments (or more specifically, to various protection groups) along with write activity happening on the segments. In some embodiments, the Unconditional VDL may be stored in log sector headers.

In various embodiments, the operations that may be performed on a segment may include writing a DULR or AULR received from a client (which may involve writing the DULR or AULR to the tail of the hot log zone and then updating the user page table), reading a cold user page (which may involve locating the data sectors of the user page and returning them without needing to apply any additional DULRs), reading a hot user page (which may involve locating the data sectors of the most recent AULR for the user page and apply any subsequent DULRs to the user page before returning it), replacing DULRs with AULRs (which may involve coalescing DULRs for a user page to create an AULR that replaces the last DULR that was applied), manipulating the log records, etc. As described herein coalescing is the process of applying DULRs to an earlier version of a user page to create a later version of the user page. Coalescing a user page may help reduce read latency because (until another DULR is written) all DULRs written prior to coalescing may not need to be read and applied on demand. It may also help reclaim storage space by making old AULRs and DULRs obsolete (provided there is no snapshot requiring the log records to be present). In some embodiments, a coalescing operation may include locating a most recent AULR and applying any subsequent DULRs in sequence without skipping any of the DULRs. As noted above, in some embodiments, coalescing may not be performed within the hot log zone. Instead, it may be performed within the cold log zone. In some embodiments, coalescing may also be performed as log records are copied from the hot log zone to the cold log zone.

In some embodiments, the decision to coalesce a user page may be triggered by the size of the pending DULR chain for the page (e.g., if the length of the DULR chain exceeds a pre-defined threshold for a coalescing operation, according to a system-wide, application-specific or client-specified policy)), or by the user page being read by a client.

Figure 9:
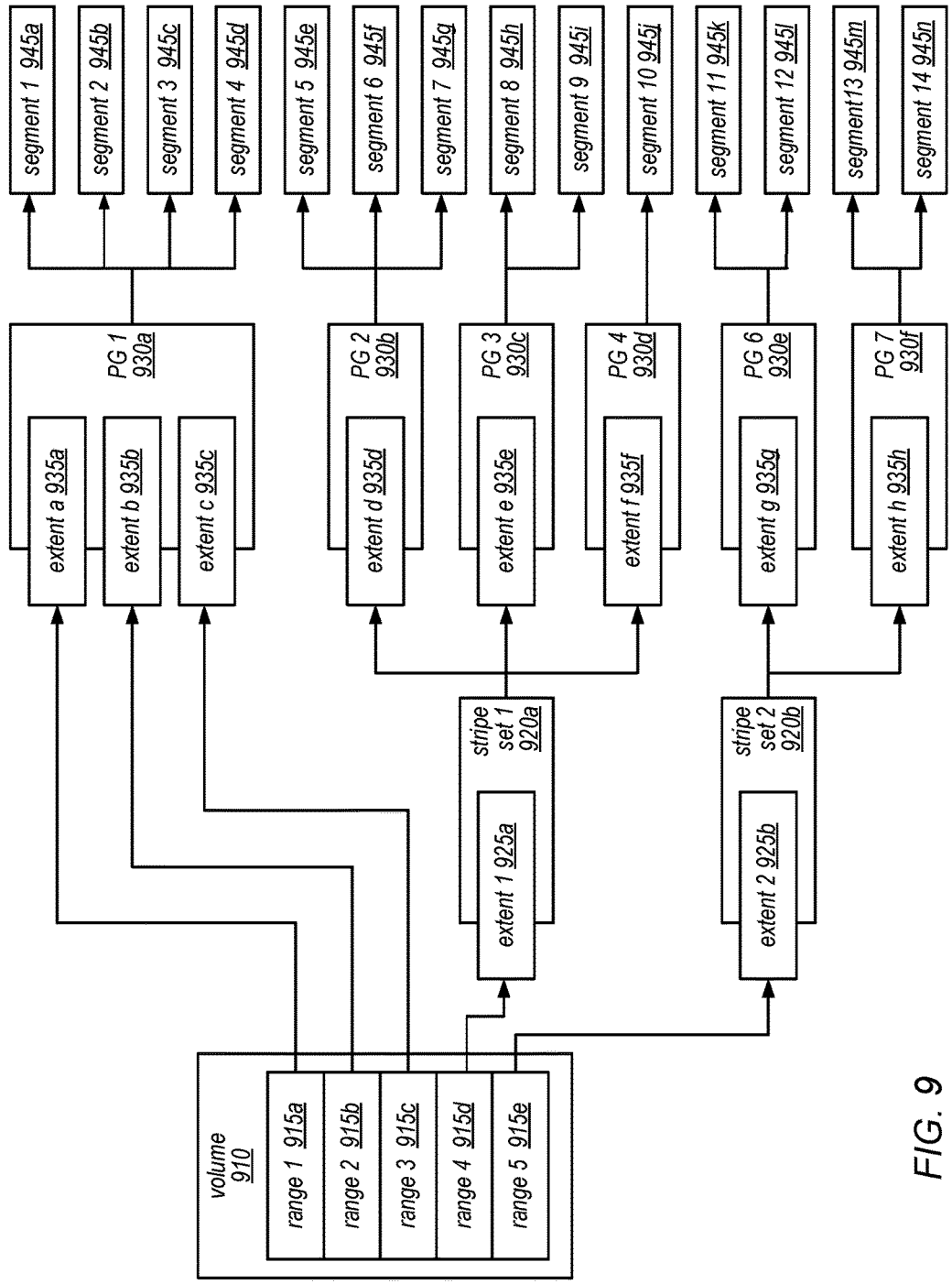
FIG. 9 is a block diagram illustrating an example configuration of a database volume, according to one embodiment.

FIG. 9 is a block diagram illustrating an example configuration of a database volume 910, according to one embodiment. In this example, data corresponding to each of various address ranges 915 (shown as address ranges 915a-915e) is stored as different segments 945 (shown as segments 945a-945n). More specifically, data corresponding to each of various address ranges 915 may be organized into different extents (shown as extents 925a-925b, and extents 935a-935h), and various ones of these extents may be included in different protection groups 930 (shown as 930a-930f), with or without striping (such as that shown as stripe set 920a and stripe set 920b). In this example, protection group 1 illustrates the use of erasure coding. In this example, protection groups 2 and 3 and protection groups 6 and 7 represent mirrored data sets of each other, while protection group 4 represents a single-instance (non-redundant) data set. In this example, protection group 8 represents a multi-tier protection group that combines other protection groups (e.g., this may represent a multi-region protection group). In this example, stripe set 1 (920a) and stripe set 2 (920b) illustrates how extents (e.g., extents 925a and 925b) may be striped into a volume, in some embodiments.

More specifically, in this example, protection group 1 (930a) includes extents a-c (935a-935c), which include data from ranges 1-3 (915a-915c), respectively, and these extents are mapped to segments 1-4 (945a-945d). Protection group 2 (930b) includes extent d (935d), which includes data striped from range 4 (915d), and this extent is mapped to segments 5-7 (945e-945g). Similarly, protection group 3 (930c) includes extent e (935e), which includes data striped from range 4 (915d), and is mapped to segments 8-9 (945h-945i); and protection group 4 (930d) includes extent f (935f), which includes data striped from range 4 (915d), and is mapped to segment 10 (945j). In this example, protection group 6 (930e) includes extent g (935g), which includes data striped from range 5 (915e), and is mapped to segments 11-12 (945k-945l); and protection group 7 (930f) includes extent h (935h), which also includes data striped from range 5 (915e), and is mapped to segments 13-14 (945m-945n).

FIGS. 2-9 discussed above have described various different examples of a database system, such as a distributed database service, implementing a separate distributed buffer cache system for storage I/O requests to a separate distributed storage system. Various other types of storage clients, may also utilize a distributed buffer cache system for a storage I/O requests to a distributed storage system. For example, in some embodiments a file management system, document management system, data archive system, or various other storage clients may utilize a distributed buffer cache system when performing storage I/O requests to a distributed storage system. Therefore, various techniques discussed above with regard to the database system, as well as techniques discussed below may be implemented, and thus a storage client may not be limited to the database examples discussed throughout the specification.

Figure 10:
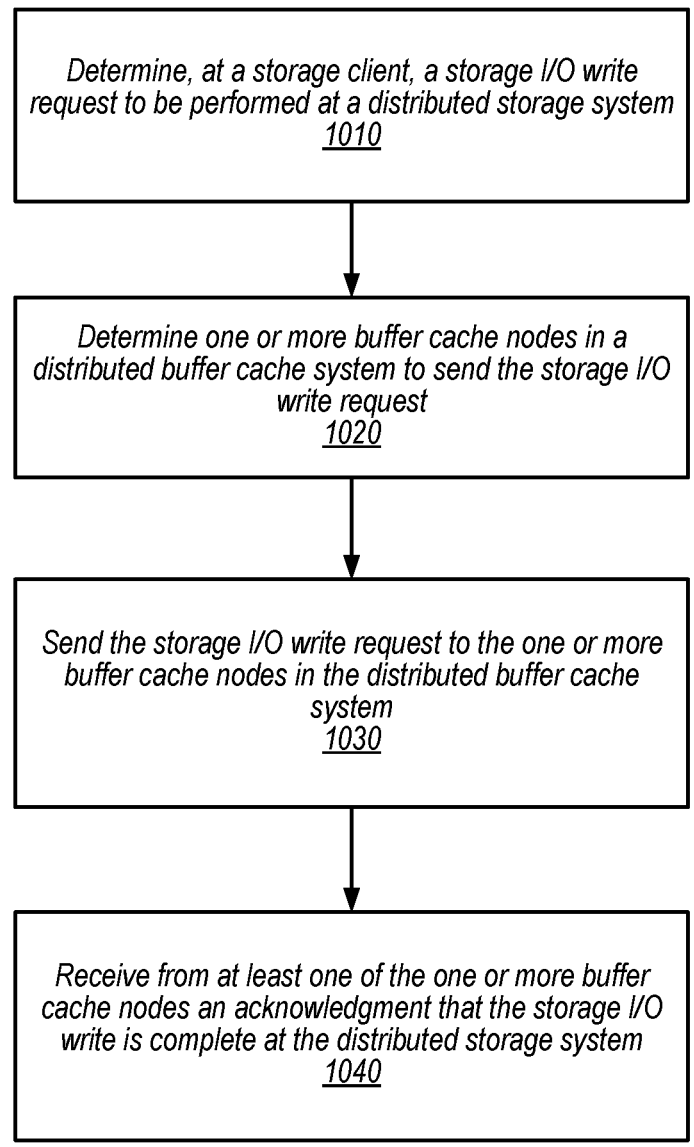
FIG. 10 is a high-level flowchart illustrating techniques for processing storage I/O (input/output) write requests in a system implementing a separate distributed buffer cache system and a separate distributed storage system, according to some embodiments.

FIG. 10 is a high-level flowchart illustrating techniques for processing storage I/O (input/output) write requests in a system implementing a separate distributed buffer cache system and a separate distributed storage system, according to some embodiments. As indicated at 1010, in various embodiments a storage I/O write request may be determined at a storage client to be performed at a distributed storage system. For example, a storage client may be, as discussed above, a database system that receives a request to update data in a database. The received request may generate one or more write requests to perform the update. These write requests may pertain to data pages, blocks, or other organization units of data persisted in the distributed storage system for the database. Storage I/O write requests indicating these changes to the respective data pages may be generated. In another example, a file management service may receive a modification to a data object, such as a document, stored in the distributed storage system. The storage I/O write request may itself be received at the file management system, (e.g., change a character value in the document) or may be an operation request (e.g., such as merge two documents) and thus, multiple storage I/O write requests may be generated to effect the operation request.

In various embodiments, one or more buffer cache nodes in a distributed buffer cache system to send the storage I/O write request may be determined, as indicated at 1020. For example, in various embodiments, as noted above, a hashing scheme or other heuristic may be used to determine which storage nodes may maintain the portion of the in-memory buffer cache to which the write request pertains. For example, if buffer cache node A maintains the record for "Customer ID=234567" in one or more buffer cache entries in the system memory of buffer cache node A then a hashing scheme/technique or other heuristic may be sufficient to identify buffer cache node A for write requests that write to or modify portions of the record for "Customer ID =234567." As different portions of the in-memory buffer cache for the storage client may be maintained at different buffer cache nodes in some embodiments, one storage I/O write request may be sent to one or more different buffer cache nodes than another storage I/O write request.

In some embodiments, some buffer cache nodes may mirror portions of the in-memory buffer cache to other buffer cache nodes. These mirror relationships may be identified using distributed buffer cache system metadata, which may map, index, list, or describe the locations of buffer cache nodes and/or the relationships between buffer cache nodes. Changes in the membership of buffer cache nodes implementing the in-memory buffer cache for the storage client may be recorded or updated in the distributed buffer cache system metadata.

As indicated at 1030, the storage I/O write request may be sent to the determined buffer cache nodes in the distributed cache system. As noted above, different storage clients may provide different information in storage I/O write requests. For instance, in some embodiments, such as the database systems described above, a storage I/O write request may be a log record or some other indication of a write to data stored in the distributed storage system. Similarly, the configuration of the distributed storage system, such as a log-structured storage system, may influence the format and/or data sent as part of the storage I/O write request to buffer cache nodes.

In various embodiments, an acknowledgment may be received from at least one buffer cache node indicating that the storage I/O write is complete at the distributed storage system, as indicated at 1040. A storage client may then consider the write, in some embodiments, to be durably persisted at the distributed storage system. As part of the acknowledgment, mapping information to locations of the completed write in the distributed storage system may also be included with the acknowledgment of the write request's completion so that a storage client may also be track the view of data that is maintained at the distributed storage system. For example, in some embodiments a write quorum requirement may have to be satisfied for a storage I/O write request to be considered complete at the distributed storage system. The acknowledgment from a buffer cache node may indicate which storage nodes acknowledged the storage I/O write request in satisfaction of the write quorum requirement.

Figure 11:
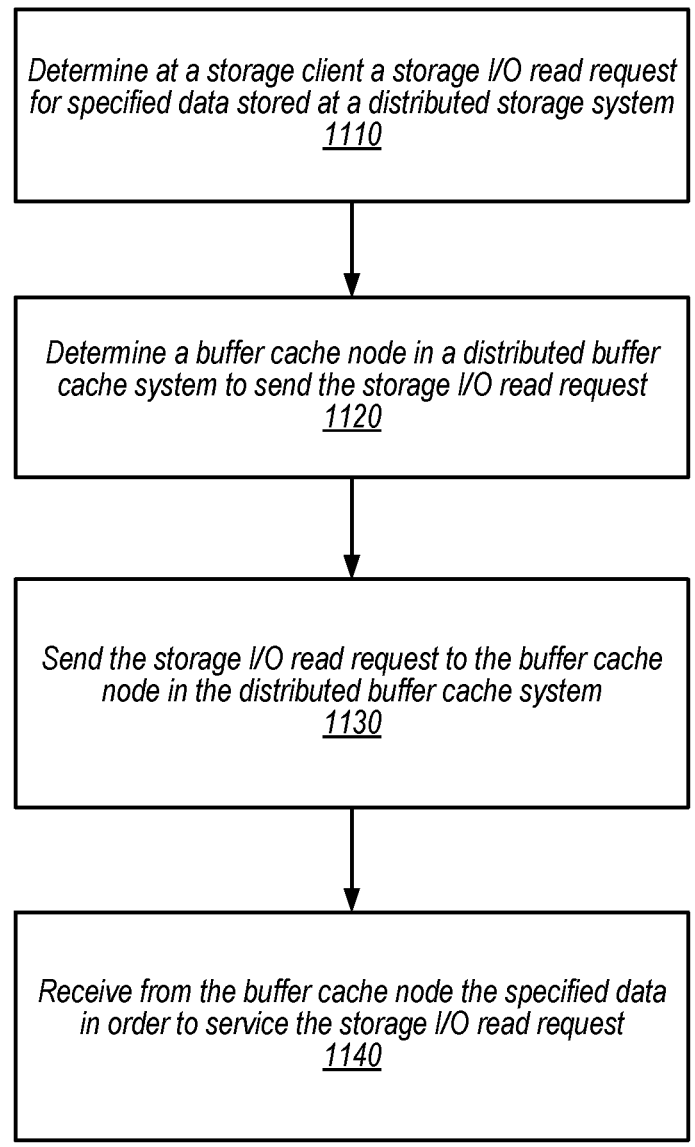
FIG. 11 is a high-level flowchart illustrating techniques for processing storage I/O (input/output) read requests in a system implementing a separate distributed buffer cache system and a separate distributed storage system, according to some embodiments.

FIG. 11 is a high-level flowchart illustrating techniques for processing storage I/O (input/output) read requests in a system implementing a separate distributed buffer cache system and a separate distributed storage system, according to some embodiments. Similar to the discussion above with regard to FIG. 10, storage I/O read requests may be determined at a storage client, as indicated at 1110, for many different reasons. A database query, for example, may be received at a storage client implementing a database system, and different records for the database may need to be read in order to obtain data to service the query. Storage I/O write requests may be generated to obtain the records in order to service the received database query. In another example, a current version of a particular data page storing application data for the storage client may be requested. The storage I/O read request for the data page may be simply sent on to the determined one or more buffer cache nodes as discussed below.

As indicated at 1120, a buffer cache node in a distributed buffer cache system may be determined to send the storage I/O read request. For instance, in some embodiments, the same hashing scheme or heuristic used to determine where to send storage I/O write requests may be used to determine buffer cache nodes to send storage I/O read requests. Thus, if a storage I/O read request for a particular data object is determined, then a buffer cache node may be determined that is apportioned the part of in-memory buffer cache in which the particular data object may be maintained. For example, if a storage client wishes to read a particular data block or page, then a buffer cache node with a portion of the in-memory buffer cache maintaining the particular data block may be identified. Previous storage I/O write requests modifying that data block may have been sent to the determined buffer cache node, so that a current version of the data block may be maintained at the buffer cache node. As noted above, multiple buffer cache nodes may mirror buffer cache entries for the same portion of the in-memory buffer cache. Distributed buffer cache system metadata may be used to determine which buffer cache nodes are replicas for the determined buffer cache node, in some embodiments, such that a storage I/O read request may be additionally, or alternatively, sent to those buffer cache nodes.

As indicated at 1130, the storage I/O read request may be sent to the determined buffer cache node in the buffer cache system, in various embodiments. The format of the storage I/O read request may, in various embodiments, be determined based on the storage client and/or the structure of the distributed storage system. For example, in some embodiments, a buffer cache entry maintained at a buffer cache node may contain the current version of a portion of the data stored in the distributed storage system. However, if, for instance, the distributed storage system implemented a log-structured data store, the data in cache entry may be modified by one or more log records maintained in another cache entry to generate a current or requested version of the specified data.

In various embodiments, the specified data may be received from the buffer cache node in order to service the storage I/O read request, as indicated at 1140. Multiple buffer cache nodes may be sent the storage I/O read request, and one or more responses may be received. Responses times for individual buffer cache nodes may vary, and may be dependent on whether a buffer cache hit or miss occurred. For those buffer cache nodes with a hit, response time may be significantly faster than buffer cache nodes that have to obtain data from the distributed storage system.

Figure 12:
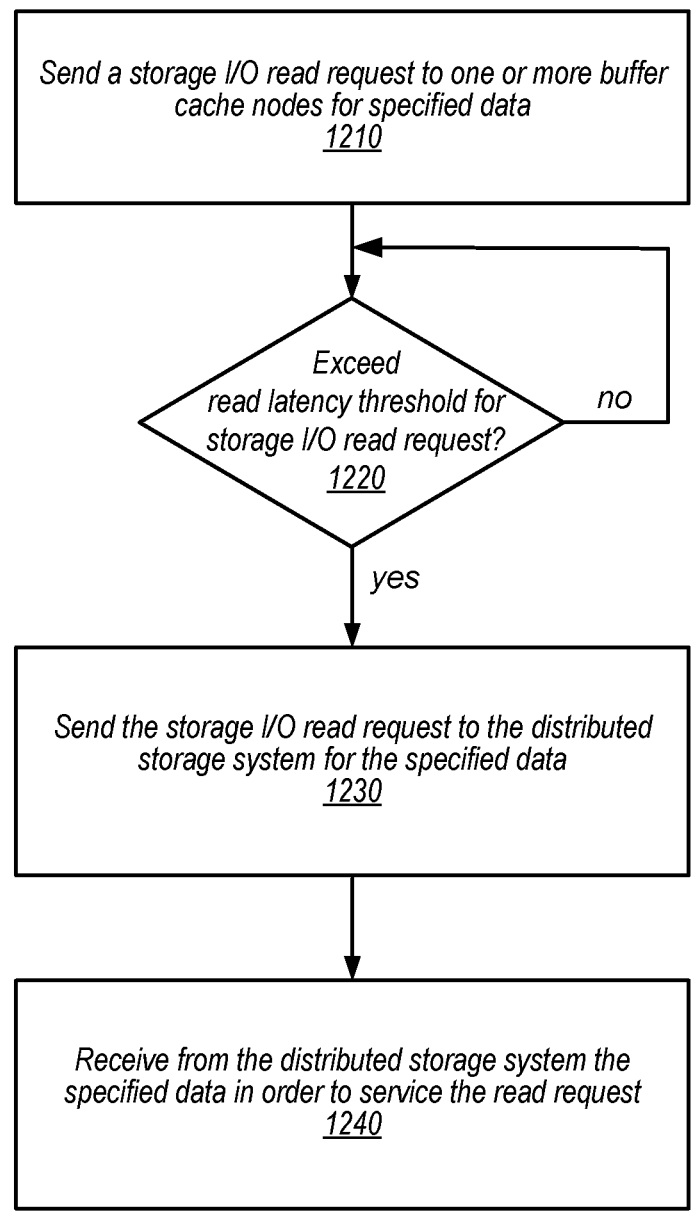
FIG. 12 is a high-level flowchart illustrating techniques for processing storage I/O (input/output) read requests in a system implementing a separate distributed buffer cache system and a separate distributed storage system for read requests exceeding a read latency threshold, according to some embodiments.

Implementing a distributed buffer cache system for storage clients may improve performance of servicing storage I/O read requests. However, in certain cases, buffer cache system service disruptions or other errors slowing the response between buffer cache nodes and a storage client may cause a pending storage I/O read request to perform less efficiently than a direct request for the data to the distributed storage system. Different measures may be implemented to prevent outlier scenarios for distributed buffer cache system performance from causing a storage client to fail an overall performance goal or guarantee (e.g., such as described in a service level agreement). FIG. 12 is a high-level flowchart illustrating techniques for processing storage I/O (input/output) read requests in a system implementing a separate distributed buffer cache system and a separate distributed storage system for read requests exceeding a read latency threshold, according to some embodiments.

As indicated at 1210, storage I/O read requests may be sent to buffer cache nodes in the distributed buffer cache system for processing, in some embodiments. Tracking information and/or other metadata may be maintained for each outstanding storage I/O read request which may include which buffer cache nodes are sent a particular storage I/O read request as well as a current pending time indicating how long a particular storage I/O read request has remained unanswered. In some embodiments, the current pending time for a storage I/O read request may be evaluated in order to determine whether a latency time threshold for a storage I/O read request is exceeded, as indicated at 1220. A latency time threshold for a storage I/O read request may be set or determined based on a throughput or other service guarantee that may be still met if alternative means of obtaining data specified in as storage I/O read request are performed. For example, if the storage I/O read request does exceed the latency time threshold for the storage I/O read request, then the storage I/O read request may be sent directly to the distributed storage system, as indicated at 1230. The distributed storage system may be able to return the specified data such that the specified data may be received from the distributed storage system in order service the read request, as indicated at 1240. Storage system metadata, such as the mapping information discussed above with regard to element 1040 in FIG. 10, may be used to determine how to request and obtain the specified data from the distributed storage system. For example, if a quorum-based distributed storage system is implemented, the storage system metadata may indicate which storage nodes in the quorum set may maintain the data sufficient to obtain the specified data. FIG. 12 also illustrates that for those storage I/O read requests that have currently pending times that do not exceed the latency time threshold, a storage client may wait before performing any alternative actions (as indicated by the negative exit from element 1220).

Although FIG. 12 is depicted in the context of storage I/O read requests sent to buffer cache nodes in the distributed buffer cache system, a similar technique may be employed for write requests. A write request may be sent to buffer cache nodes, and if a write acknowledgment is not received back within some write latency threshold, the storage I/O write request may be sent directly to the distributed storage system. If a write acknowledgment is received back from the distributed storage system prior to an acknowledgment of the write from the buffer cache nodes, then a buffer cache node sent the storage I/O write request may need to have entries to which the storage I/O write request pertains marked, or identified, as invalid, in some embodiments.

FIG. 12 illustrates various example methods for ensuring a level providing read and/or write performance for a system implementing a distributed buffer cache system. One other such technique may be to send multiple copies of a storage I/O read request, and/or a storage I/O write request to different buffer nodes, so that the write/read may be accepted as performed after the first buffer cache node acknowledges the storage I/O operation.

Figure 13:
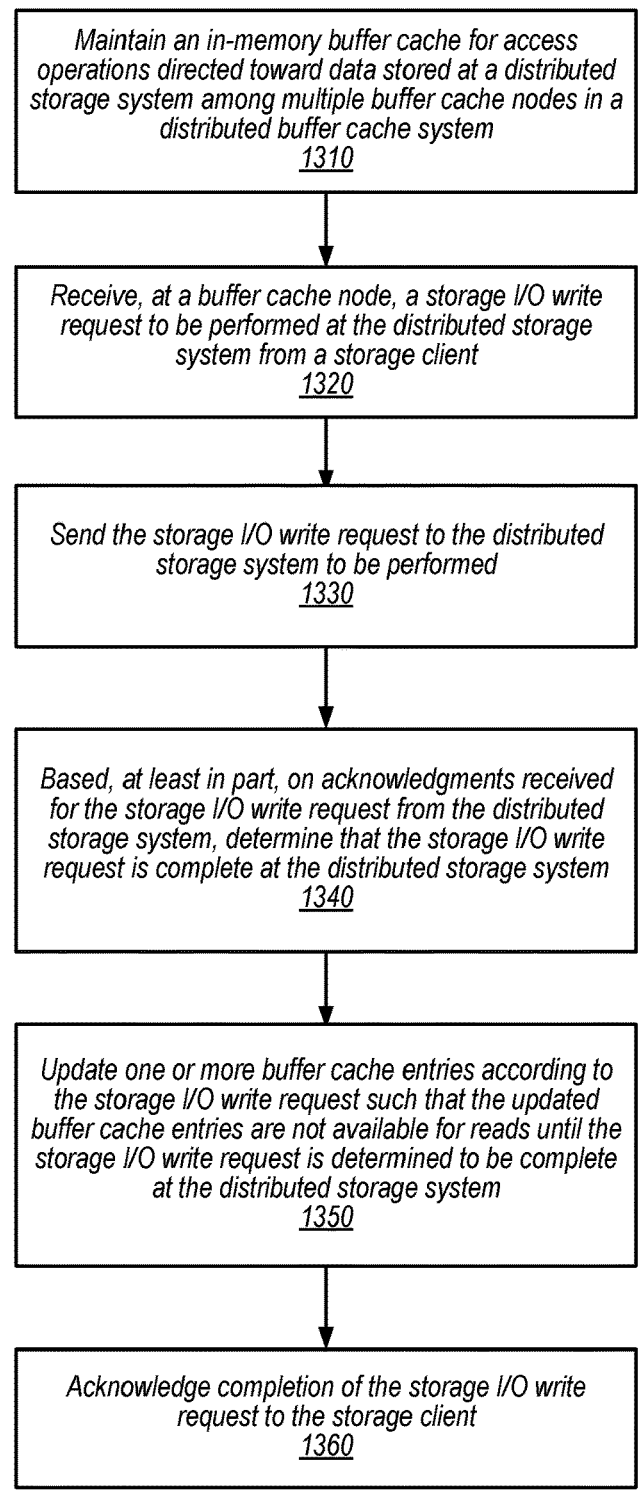
FIG. 13 is a high-level flowchart illustrating techniques for processing storage I/O (input/output) write requests at buffer cache nodes in a distributed buffer cache system, according to some embodiments.

FIGS. 5-7 discussed above provided some examples of the ways a distributed buffer cache system may be maintained among buffer cache nodes, as well as how it may be used. Although discussed in the context of a distributed database system, the techniques discussed above with regard to these figures, as well as the techniques discussed below with regard to FIGS. 13 and 14, may be implemented by a variety of distributed buffer cache systems, and are not intended to be limiting. FIG. 13, for instance, is a high-level flowchart illustrating techniques for processing storage I/O (input/output) write requests at buffer cache nodes in a distributed buffer cache system, according to some embodiments.

As indicated at 1310, an in-memory buffer cache for access operations directed toward data stored at a distributed storage system among multiple buffer cache nodes in a distributed buffer cache system may be maintained, in various embodiments. As discussed above, buffer cache nodes may provide system memory space for different portions of in-memory buffer caches for storage clients. In various embodiments, system memory may broadly encompassing emerging data storage technologies such as non-volatile RAM (NV-RAM), battery or super-capacitor backed RAM, various different post NAND flash and/or system memory technologies, such as memristor based resistive random access memory (ReRAM), three-dimensional NAND technologies, Ferroelectric RAM, magnetoresistive RAM (MRAIVI), or any of various types of phase change memory (PCM), or various other storage technologies that share performance characteristics between traditional system memory and persistent storage devices, such as block-based storage devices. In-memory buffer caches may be apportioned among different buffer cache nodes according to a hashing scheme or other heuristic such that buffer cache nodes maintaining a portion of data stored in the distributed storage system in buffer cache entries may be identified using the same hashing scheme or heuristic. Buffer cache nodes may be added or removed as needed, such as may be determined by the amount of data stored by a storage client in the distributed storage system. By providing a way to scale up or down the amount of system memory for implementing buffer caches, the cost of implementing an in-memory buffer cache may become linear. Moreover, as the amount of memory of multiple buffer cache nodes may be used together to implement buffer caches for storage clients that may dwarf the local memory available to storage client for local caching, some storage clients may effectively operate as though all data were in system memory, rather than only a portion of data. The in-memory buffer cache may, in some embodiments, be implemented as a write-through cache.

Buffer cache nodes may operate independently to process storage I/O requests received from storage clients, in some embodiments. For example, as indicated at 1320, a storage I/O write request to be performed at a distributed storage system may be received at a buffer cache node from a storage client. The storage I/O write request, as noted above, may be formatted differently according to the storage client and/or the distributed storage system. For example, in some embodiments, the storage client may be a database, and the storage I/O write request may be a log record (e.g., a redo log record) indicating an update or change to a data page stored for the database. However, in at least some embodiments, the storage I/O write request may be the data block, page, or other unit of data that is to replace a portion of the data, which may simply replace or fill a buffer cache entry without further processing.

As indicated at 1330, the storage I/O write request may be sent to the distributed storage system to be performed, in various embodiments. Requesting performance of the storage I/O write request may be dependent on the nature of the distributed storage system. For example, in some embodiments, the distributed storage system may be a quorum-based storage system, where storage I/O write requests may have to be completed at a number of storage nodes in a quorum set of storage nodes sufficient to satisfy a write quorum requirement for the storage I/O write request. Thus, the storage I/O write request may be sent to enough storage nodes sufficient to satisfy the write request. Buffer cache nodes may maintain an access scheme, such as distributed storage metadata mapping storage client data to locations in a distributed storage system so that the storage I/O write request may be completed at the distributed storage system. For example, a storage service driver, such as discussed above with regard to FIGS. 5 and 6, may maintain receive information from a distributed storage system sufficient to perform storage I/O write requests in order to achieve completion of those write requests.

Based, at least in part, on one or more acknowledgments received for the storage I/O write request from the distributed storage system, a buffer cache node may determine that the storage I/O write request is complete at the distributed storage system, as indicated at 1340, in various embodiments. A completion determination, similar to the discussion above regarding sending the storage I/O write request, may be dependent on the type or implementation of the distributed storage system. For example, in some embodiments, a single storage node may acknowledge back to a buffer cache node that the storage I/O write request is complete on behalf of itself as well as other storage nodes. In another example, in some embodiments, different storage nodes may acknowledge back to the buffer cache node completion of the storage I/O write request so that a determination may be made as to whether a write quorum (or some other durability requirement) is met. In at least some embodiments, a buffer cache node may determine whether or not a particular storage I/O write request is complete, and not the distributed storage system.

As indicated at 1350, one of more buffer cache entries in the system memory at the buffer cache node may be updated according to the storage I/O write request such that updated buffer cache entries are not available for reads until the storage I/O write request is determined to be complete at the distributed storage system, in various embodiments. For example, in some embodiments, when a storage I/O write request is received and buffer cache entries maintained at the buffer cache node maintain a prior version of the data to which the write request pertains, those buffer cache entries may be marked as "dirty" or "write-in-progress." Depending on the type of storage client, this data may be valid for certain read requests (e.g., a storage client that is using log-structured or other type of data storage that allows for multiple versions of data in time). However, in a least some embodiments, read requests may be blocked (or queued) which request data for those buffer cache entries marked as "dirty" or "write-in-progress." Similarly, if new buffer cache entries are updated with the write request, they may also be marked as "write-in-progress" and blocked for read access. Successful completion of a storage I/O write request may allow for buffer cache entries marked as "write-in-progress" to become available for reads (or updated according to the storage request if marked as "dirty"). Unsuccessful storage I/O write requests (e.g., such as error messages received instead of acknowledgments) may have their respective new buffer cache entries deleted, removed, or overwritten, while buffer cache entries marked as dirty may have this designation removed and made available again for read requests.

In at least some embodiments, completion of the storage I/O write request may be acknowledged to the storage client, as indicated at 1360. Various other information may also be included with the acknowledgement, such as mapping or location information about the location of the completed write in the distributed storage system (e.g., which particular storage nodes completed the write request). Acknowledgements may include information about the state or health of the distributed storage system, as well as indicate changes to an access scheme for data stored at the distributed storage system for the storage client.

In some embodiments, groups of buffer nodes may mirror portions of the in-memory buffer cache, providing additional replicas of the buffer cache for storage clients. A storage I/O write request may be sent to some or all of the replicas mirroring the same portion of the buffer cache, in some embodiments. Buffer cache nodes may also communicate information about their current contents to other buffer cache nodes maintaining a mirror or replica, such as by forwarding complete storage I/O requests, or sending a manifest or list of current buffer cache entries.

Figure 14:
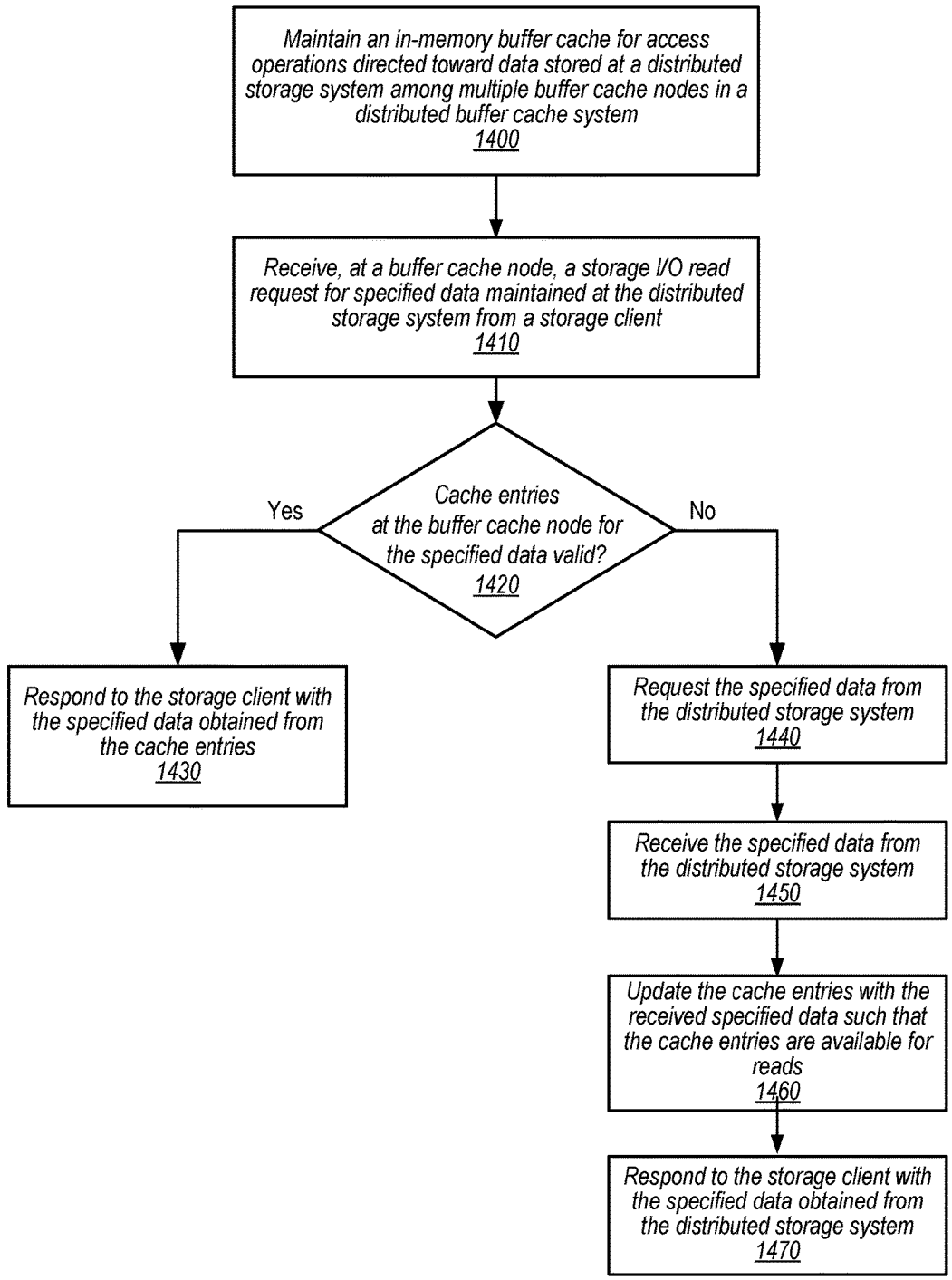
FIG. 14 is a high-level flowchart illustrating techniques for processing storage I/O (input/output) read requests at buffer cache nodes in a distributed buffer cache system, according to some embodiments.

By implementing an in-memory buffer cache in a distributed buffer cache system, storage clients may obtain the performance benefits of accessing system memory, rather than persistent storage. As network communication speeds continue to increase in speed as well as bandwidth, over the network communication with nodes maintaining information in system memory may outperform the same type of communications made to nodes that have to access persistent storage. FIG. 14 is a high-level flowchart illustrating techniques for processing storage I/O (input/output) read requests at buffer cache nodes in a distributed buffer cache system, according to some embodiments.

As indicated at 1400, an in-memory buffer cache may be maintained for access operations directed toward data stored at a distributed storage system among multiple buffer cache nodes in a distributed buffer cache system, in various embodiments. As discussed above with regard to element 1310 in FIG. 13, buffer cache nodes may provide system memory space for different portions of in-memory buffer caches for storage clients. In-memory buffer caches may be apportioned among different buffer cache nodes according to a hashing scheme or other heuristic such that buffer cache nodes maintaining a portion of data stored in the distributed storage system in buffer cache entries may be identified using the same hashing scheme or heuristic. Buffer cache nodes may be added or removed as needed, such as may be determined by the amount of data stored by a storage client in the distributed storage system. The in-memory buffer cache implemented by the distributed buffer cache system may, in some embodiments, be a write-through cache.

Buffer cache nodes may also individually process storage I/O read requests. As indicated at 1410, a buffer cache node may receive a storage I/O read request for specified data maintained at the distributed storage system from a storage client. In various embodiments, a determination may be made as to whether one or more cache entries for the specified data are valid, as indicated at 1420. Valid cache entries may be cache entries that are not marked as "dirty," "write-in-progress," otherwise block from read requests. For those valid cache entries for the specified data, a response may be sent to the storage client with the specified data obtained from the one or more cache entries, as indicated at 1430. For invalid cache entries (e.g., cache entries marked as "dirty," cache misses, or where the data is generally unavailable), the specified data may be requested from the distributed storage system. Depending on the distributed storage, a read request may be sent to the distributed storage system for the specified data. For example, in a quorum-based distributed storage system, the buffer cache node may access mapping information or other storage system metadata to determine which storage node may have the specified data, and then send a request to the storage node for the specified data, in some embodiments.

The specified data may then be received from the distributed storage system, as indicated at 1450. Cache entries at the buffer cache node may be updated with the specified data such that the cache entries are available for reads, as indicated 1460. As discussed above with regard to FIG. 13, cache entries may be made available for reads by removing indications of "write-in-progress" or updating indexes or other information listing the state of buffer cache entries. Subsequent read requests may then access the updated buffer cache entries without having to request the specified data from the distributed storage system. In various embodiments, the buffer cache node may then respond to the storage client with the specified data obtained from the distributed storage system, as indicated at 1470.

As noted above, a distributed buffer cache system may be implemented in different ways. A standalone distributed system, with dedicated system devices or components may be used to implement in-memory buffer caches for storage clients of a distributed storage system. For example, the different buffer cache nodes 530, 540, and 550 illustrated in FIG. 5, may be dedicated or permanently allocated buffer cache nodes contributing their respective system memories as part of a buffer cache service, such as buffer cache service 470 described above in FIG. 4. In some embodiments, a distributed buffer cache system may be implemented in part or in whole from compute nodes of another distributed storage system that may be provisioned to implement in-memory buffer caches for storage clients. For example, in at least some embodiments, compute nodes that make up a reserve capacity for a separate distributed system, such as those compute nodes that may be idle during typical traffic or workload for the distributed system, may be provisioned by a distributed buffer cache system in order to implement some or all of the in-memory buffer caches maintained for storage clients at the distributed buffer cache system. Some examples of reserve compute capacity may include purchased opportunities to utilize compute nodes, excess capacity of nodes to deal with vagaries of demand fluctuation for compute service, and/or that capacity may be added in larger units than closely tracks the increased use of compute nodes. FIG. 15 is a high-level flowchart illustrating techniques for provisioning compute nodes from a separate distributed system for a distributed buffer cache system, according to some embodiments. A distributed buffer cache manager or other system or component of the distributed buffer cache system may implement the techniques discussed below with regard to FIGS. 15 and 16. Alternatively, another system or device, such as a storage client, or a distributed storage service manager module, node, or other component may be configured to implement some or all of the techniques discussed below.

As indicated at 1510, a request to a separate distributed storage system may be sent for one or more compute nodes in order to provision respective system memory of the one or more compute nodes for the distributed buffer cache system. For example, a distributed buffer cache service may be offered as one of multiple network-based distributed services, such as illustrated above in FIG. 3, and a request from the distributed buffer cache service may be sent to another service, such as may be offered as part of the same network-based services platform, such as other virtual computing services 340 offered as part of network-based services platform 300. A distributed buffer cache manager module may determine a number of compute nodes needed in order to provide a particular size of in-memory buffer cache for a storage client and/or a particular number of nodes in order to provide a certain number of replicas of the buffer cache nodes for a distributed storage client. A request to other distributed services for computes nodes to implement the buffer cache may be sent indicating a particular number of compute nodes, such as the determined need, or a may indicate a more general request such as all available compute nodes. Similarly, a determination may be made at the separate distributed system as to the number of available compute nodes for provisioning to the distributed buffer cache system, and thus, a request exceeding the number of available nodes may be rejected or responded to with the compute nodes that are determined to be available.

Mapping information, such as network address, and configuration information, such as the amount of available system memory, computational capabilities, operating system information, or any other information that may be needed to provision the compute nodes for the distributed buffer cache system may be sent to the distributed buffer cache system in response to the request. For instance, a listing of available storage nodes, their respective network addresses, their physical locations (e.g., a particular data center or availability zone), and the respective system memory capacities for each of the available storage nodes may be received.

Using the mapping information received from the separate distributed system, buffer cache instances, applications, programs, etc. . . . may be launched or instantiated on the newly provisioned compute nodes. A storage service driver, as discussed above with regard to FIG. 5 for example, may establish a connection with the distributed storage system and may obtain mapping information necessary to perform storage I/O operations. As indicated at 1520, respective portions of the in-memory buffer cache may be allocated to the provisioned system memories for the one or more compute nodes. As discussed above with regard to FIGS. 10 and 11, portions of the in-memory buffer cache may be distributed among buffer cache nodes according to various schemes. For example, in some embodiments, a hashing scheme may be implemented to distribute portions of the in-memory buffer cache. In at least some embodiments, a some buffer cache nodes, such as the newly provisioned compute nodes, may mirror the same portions of the in-memory buffer cache maintained in the system memory of another buffer cache node. Allocation of respective portions of system memory may involve a warming or synchronization operation with those buffer cache nodes that are mirroring a portion of the in-memory buffer cache. For example, a newly provisioned compute node may request a listing of portions of the data in the distributed storage system stored in buffer cache entries from an already established buffer cache node. The newly provisioned buffer cache node may then request the listed portions of the data from the distributed storage system and fill the corresponding buffer cache entries with the data obtained from the distributed storage system.

In various embodiments, the one or more compute nodes provisioned for the distributed buffer cache system may then be made available for processing storage I/O requests, as indicated at 1530. For example, change notifications and/or new mapping information may be sent to a storage client (or to a client-side cache/storage driver, such as illustrated above in FIG. 4). Thus, subsequent storage I/O requests generated, received, determined, and/or sent from the storage client may be include the newly provisioned compute nodes when determining which buffer cache nodes to send storage I/O requests.

In some embodiments, a separate distributed storage system may implement resource sharing or management policies that determine when a particular compute node or group of compute nodes may be available for provisioning to another distributed system, such as a distributed buffer cache system. For example, in some embodiments, the separate distributed system may determine demand or workload for available or provisioned compute nodes. Based on the determined demand, one or more compute nodes may be reclaimed from the distributed buffer cache system in order to perform higher priority or other tasks as determined by the separate distributed system. Consider the scenario where a group of compute nodes that make up part of a reserve capacity for a distributed storage service are provisioned for the distributed buffer cache system. A sudden spike in demand for the separate distributed system may occur, resulting in a need to activate reserve compute nodes in order to satisfy some service level agreement for the separate distributed storage system. The separate distributed storage service may need to recover the compute nodes provisioned to the distributed buffer cache system in order to meet the service level agreement. FIG. 16 is a high-level flowchart illustrating techniques for reclaiming provisioned compute nodes from a distributed buffer cache system for a separate distributed system, according to some embodiments.

As indicated at 1610, a reclamation request may be received from a separate distributed computing system that reclaims one, some, or all of previously provisioned compute nodes from the distributed buffer cache system, in some embodiments. The reclamation request may include identification of the particular compute nodes needed, or a general request for a certain number of compute nodes. A time needed, lease expiration, or some other deadline or indication of when the compute nodes may cease to implement portions of the distributed buffer cache system. In some embodiments, the request may simply indicate that the reclaimed nodes are no longer operating as buffer cache nodes, as the separate distributed computing system may be able to regain control without acknowledgment and/or permission from the distributed buffer cache system.

As indicated at 1620, a respective portion of the in-memory buffer cache for the compute nodes to be reclaimed may be de-allocated, in some embodiments. For example, buffer cache system metadata which may list or index the buffer cache nodes, their respective one or more in-memory buffer caches, addresses, etc. . . . may be updated to remove the compute nodes to be reclaimed. Data maintained in the system memory of the reclaimed compute nodes may, in various embodiments, be lost. In some embodiments, a manifest, listing, or other set of information describing the current contents of a reclaimed compute node may be sent to a distributed buffer cache manager module, or some other system or device, so that the cache entries may be again retrieved from the distributed storage system and placed on a remaining buffer cache node.

The compute nodes to be reclaimed may then be made unavailable for processing storage I/O requests, as indicated at 1630. As discussed above with regard to element 1520 in FIG. 15, storage clients or other users of the distributed buffer cache system may be notified of changes in the buffer cache nodes available to process storage I/O requests. For instance, change notifications and/or new mapping information may be sent to a storage client (or to a client-side cache/storage driver, such as illustrated above in FIG. 4) indicating the reclaimed compute nodes. Thus, subsequent storage I/O requests generated, received, determined, and/or sent from the storage client may not include the reclaimed compute nodes when determining which buffer cache nodes to send storage I/O requests.

Although FIG. 16 is presented in the context of a reclamation request from a separate distributing computing system reclaiming a compute node, similar methods or techniques may be implemented to deal generally with any loss of a buffer cache node, such as due to a system or power failure, in some embodiments. For instance, it may be detected that a buffer cache node is no longer available to a storage client or a distributed buffer cache system manager. In response, a respective portion of the in-memory buffer cache for the unavailable node may be de-allocated, and the unavailable buffer cache node may be made unavailable for processing storage I/O requests, such us by updating mapping information for the buffer cache distribution among buffer cache nodes sent to a storage client.

The techniques discussed above with regard to FIGS. 15 and 16 may allow a distributed buffer cache system to be scalable. For example, if a given storage client's data is frequently accessed or large, the number of compute nodes implementing the in-memory buffer cache for the storage client may be increased. Similarly, if a change occurs and the storage client's workload decreases or the amount of data stored for the storage client in the in-memory buffer cache decreases depending on the amount of data for which the buffer cache operates is reduced, then the number of compute nodes implementing the in-memory buffer cache may be reduced. A distributed buffer cache system manager module or some other component, may perform the various techniques above as part of providing a scalable in-memory buffer cache for storage clients.

The methods described herein may in various embodiments be implemented by any combination of hardware and software. For example, in one embodiment, the methods may be implemented by a computer system (e.g., a computer system as in FIG. 17) that includes one or more processors executing program instructions stored on a computer-readable storage medium coupled to the processors. The program instructions may be configured to implement the functionality described herein (e.g., the functionality of various servers and other components that implement the database services/systems and/or storage services/systems described herein).

Figure 17:
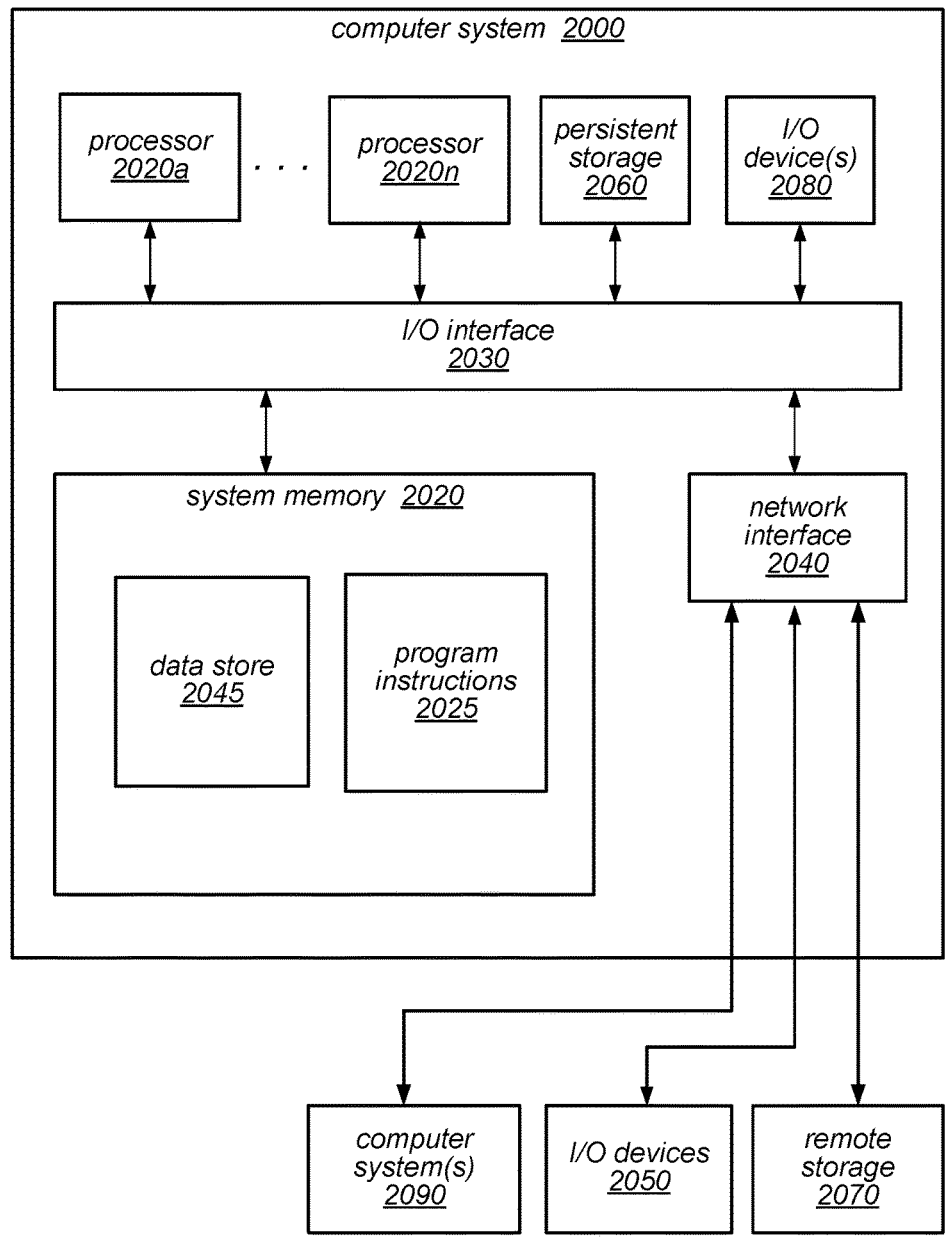
FIG. 17 is a block diagram illustrating an example computer system, according to various embodiments.

FIG. 17 is a block diagram illustrating a computer system configured to implement at least a portion of the database systems described herein, according to various embodiments. For example, computer system 2000 may be configured to implement a database engine head node of a database tier, or one of a plurality of storage nodes of a separate distributed storage system that stores databases and associated metadata on behalf of clients of the database tier, in different embodiments. Computer system 2000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 2000 includes one or more processors 2010 (any of which may include multiple cores, which may be single or multi-threaded) coupled to a system memory 2020 via an input/output (I/O) interface 2030. Computer system 2000 further includes a network interface 2040 coupled to I/O interface 2030. In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA. The computer system 2000 also includes one or more network communication devices (e.g., network interface 2040) for communicating with other systems and/or components over a communications network (e.g. Internet, LAN, etc.). For example, a client application executing on system 2000 may use network interface 2040 to communicate with a server application executing on a single server or on a cluster of servers that implement one or more of the components of the database systems described herein. In another example, an instance of a server application executing on computer system 2000 may use network interface 2040 to communicate with other instances of the server application (or another server application) that may be implemented on other computer systems (e.g., computer systems 2090).

In the illustrated embodiment, computer system 2000 also includes one or more persistent storage devices 2060 and/or one or more I/O devices 2080. In various embodiments, persistent storage devices 2060 may correspond to disk drives, tape drives, solid state memory, other mass storage devices, or any other persistent storage device. Computer system 2000 (or a distributed application or operating system operating thereon) may store instructions and/or data in persistent storage devices 2060, as desired, and may retrieve the stored instruction and/or data as needed. For example, in some embodiments, computer system 2000 may host a storage system server node, and persistent storage 2060 may include the SSDs attached to that server node.

Computer system 2000 includes one or more system memories 2020 that are configured to store instructions and data accessible by processor(s) 2010. In various embodiments, system memories 2020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1220 may contain program instructions 2025 that are executable by processor(s) 2010 to implement the methods and techniques described herein. In various embodiments, program instructions 2025 may be encoded in platform native binary, any interpreted language such as Java™ byte-code, or in any other language such as C/C++, Java™, etc., or in any combination thereof. For example, in the illustrated embodiment, program instructions 2025 include program instructions executable to implement the functionality of a database engine head node of a database tier, or one of a plurality of storage nodes of a separate distributed storage system that stores databases and associated metadata on behalf of clients of the database tier, in different embodiments. In some embodiments, program instructions 2025 may implement multiple separate clients, server nodes, and/or other components.

In some embodiments, program instructions 2025 may include instructions executable to implement an operating system (not shown), which may be any of various operating systems, such as UNIX, LINUX, Solaris™, MacOS™, Windows™, etc. Any or all of program instructions 2025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 2000 via I/O interface 2030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 2000 as system memory 2020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 2040.

In some embodiments, system memory 2020 may include data store 2045, which may be configured as described herein. For example, the information described herein as being stored by the database tier (e.g., on a database engine head node), such as a transaction log, an undo log, cached page data, or other information used in performing the functions of the database tiers described herein may be stored in data store 2045 or in another portion of system memory 2020 on one or more nodes, in persistent storage 2060, and/or on one or more remote storage devices 2070, at different times and in various embodiments. Similarly, the information described herein as being stored by the storage tier (e.g., redo log records, coalesced data pages, and/or other information used in performing the functions of the distributed storage systems described herein) may be stored in data store 2045 or in another portion of system memory 2020 on one or more nodes, in persistent storage 2060, and/or on one or more remote storage devices 2070, at different times and in various embodiments. In general, system memory 2020 (e.g., data store 2045 within system memory 2020), persistent storage 2060, and/or remote storage 2070 may store data blocks, replicas of data blocks, metadata associated with data blocks and/or their state, database configuration information, and/or any other information usable in implementing the methods and techniques described herein.

In one embodiment, I/O interface 2030 may be configured to coordinate I/O traffic between processor 2010, system memory 2020 and any peripheral devices in the system, including through network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments, some or all of the functionality of I/O interface 2030, such as an interface to system memory 2020, may be incorporated directly into processor 2010.

Network interface 2040 may be configured to allow data to be exchanged between computer system 2000 and other devices attached to a network, such as other computer systems 2090 (which may implement one or more storage system server nodes, database engine head nodes, and/or clients of the database systems described herein), for example. In addition, network interface 2040 may be configured to allow communication between computer system 2000 and various I/O devices 2050 and/or remote storage 2070. Input/output devices 2050 may, in some embodiments, include one or more display terminals, keyboards, keypads, touchpads, scanning devices, voice or optical recognition devices, or any other devices suitable for entering or retrieving data by one or more computer systems 2000. Multiple input/output devices 2050 may be present in computer system 2000 or may be distributed on various nodes of a distributed system that includes computer system 2000. In some embodiments, similar input/output devices may be separate from computer system 2000 and may interact with one or more nodes of a distributed system that includes computer system 2000 through a wired or wireless connection, such as over network interface 2040. Network interface 2040 may commonly support one or more wireless networking protocols (e.g., Wi-Fi/IEEE 802.11, or another wireless networking standard). However, in various embodiments, network interface 2040 may support communication via any suitable wired or wireless general data networks, such as other types of Ethernet networks, for example. Additionally, network interface 2040 may support communication via telecommunications/telephony networks such as analog voice networks or digital fiber communications networks, via storage area networks such as Fibre Channel SANs, or via any other suitable type of network and/or protocol. In various embodiments, computer system 2000 may include more, fewer, or different components than those illustrated in FIG. 17 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more web services. For example, a database engine head node within the database tier of a database system may present database services and/or other types of data storage services that employ the distributed storage systems described herein to clients as web services. In some embodiments, a web service may be implemented by a software and/or hardware system designed to support interoperable machine-to-machine interaction over a network. A web service may have an interface described in a machine-processable format, such as the Web Services Description Language (WSDL). Other systems may interact with the web service in a manner prescribed by the description of the web service's interface. For example, the web service may define various operations that other systems may invoke, and may define a particular application programming interface (API) to which other systems may be expected to conform when requesting the various operations.

In various embodiments, a web service may be requested or invoked through the use of a message that includes parameters and/or data associated with the web services request. Such a message may be formatted according to a particular markup language such as Extensible Markup Language (XML), and/or may be encapsulated using a protocol such as Simple Object Access Protocol (SOAP). To perform a web services request, a web services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the figures and described herein represent example embodiments of methods. The methods may be implemented manually, in software, in hardware, or in a combination thereof. The order of any method may be changed, and various elements may be added, reordered, combined, omitted, modified, etc.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:
1. A system, comprising:
a distributed storage system that stores data on persistent storage, the distributed storage system comprising a plurality of storage nodes having one or more respective processors; and
a distributed in-memory cache system that caches at least a portion of the data in the distributed storage system, the distributed in-memory cache system comprising a plurality of cache nodes having one or more respective processors, wherein an individual cache node is configured to:

cache in memory a redo log record for a write request on the data;
send the redo log record to the distributed storage system;
receive a sufficient number of acknowledgments from different ones of the storage nodes to satisfy a write quorum requirement; and
responsive to the acknowledgments, acknowledge that the write request is completed.

2. The system of claim 1, further comprising a database engine head node configured to generate the redo log record from the write request and provide the redo log record to the individual cache node.

3. The system of claim 1, wherein the distributed in-memory cache system is a multi-tenant cache such that a given cache node caches different data for a plurality of different storage clients.

4. The system of claim 1, wherein the distributed in-memory cache system is a write-through cache.

5. The system of claim 1, further configured to:
determine, based at least in part on a workload experienced by the cache nodes, that additional cache nodes should be provisioned for the distributed in-memory cache system; and
responsive to the determination, provisioning the additional cache nodes and allocating at least a portion of memory of the distributed in-memory cache system to the additional cache nodes.

6. A method, comprising:
performing, via a distributed storage system comprising a plurality of storage nodes:
storing data on persistent storage based at least in part on write requests, wherein the data is replicated across the storage nodes according to a write quorum requirement;
performing, via an individual cache node in a plurality of cache nodes of a distributed in-memory cache system:
caching in memory a redo log record for a write request;
sending the redo log record to the distributed storage system;
receiving a sufficient number of acknowledgments from different ones of the storage nodes to satisfy a write quorum requirement; and
responsive to the acknowledgments, acknowledging that the write request is completed.

7. The method of claim 6, further comprising:
performing, via a database engine head node:
receiving the write request;
generating the redo log record from the write request; and
providing the redo log record to the individual cache node.

8. The method of claim 6, wherein the individual cache node caches a copy of a data page to which the redo log record pertains, and caching the redo log comprises applying the redo log record to the data page.

9. The method of claim 6, further comprising:
receiving a read request for a specified data from a storage client;
determining that one or more cache entries for the specified data in the distributed in-memory cache system are valid; and
providing to the storage client the specified data obtained from the one or more cache entries.

10. The method of claim 6, further comprising:
receiving a read request for a specified data from a storage client;
determining that one or more cache entries for the specified data in the distributed in-memory cache system are invalid; and
responsive to the determination:
obtaining the specified data from the distributed storage system;
updating the one or more cache entries with the obtained specified data such that the one or more cache entries are available for reads; and
providing to the storage client the specified data obtained from the distributed storage system.

11. The method of claim 6, further comprising:
receiving a read request for a specified data from a storage client;
determining that one or more cache entries for the specified data in the distributed in-memory cache system indicate a write-in-progress state;
responsive to the determination, blocking the read request until another determination that one or more writes to the specified data is complete in the distributed storage system; and
responsive to the other determination, updating the one or more cache entries such that the one or more cache entries are available for reads.

12. The method of claim 6, further comprising:
receiving a read request for a specified data from a storage client;
determining that a read latency threshold for the read request is exceeded; and
responsive to the determination, obtaining the specified data from the distributed storage system without receiving the specified data from the distributed in-memory cache system.

13. The method of claim 6, further comprising:
determining, based at least in part on a workload experienced by the cache nodes, that additional cache nodes should be provisioned for the distributed in-memory cache system; and
responsive to the determination, provisioning the additional cache nodes and allocating at least a portion of memory of the distributed in-memory cache system to the additional cache nodes.

14. The method of claim 10, further comprising:
receiving a reclamation request from a separate distributed computing system reclaiming one or more cache nodes from the distributed in-memory cache system; and
responsive to the reclamation request, deallocating memory the distributed in-memory cache system hosted by the one or more cache nodes and making the one or more cache nodes unavailable for processing requests for the distributed in-memory cache system.

15. The method of claim 10, further comprising:
identifying the individual cache node to handle the redo log record, wherein the identification is performed based at least in part on a hashing scheme that distributes portions of the distributed in-memory cache system across the cache nodes.

16. The method of claim 10, further comprising:
performing, via the individual cache node, sending a manifest or list of its current cache entries to another cache node of the plurality of cache nodes, wherein the other cache node mirrors the individual cache node.

17. A non-transitory computer-readable storage medium, storing program instructions that when executed by one or more processors cause the one or more processors to:
- perform, via an individual cache node of a distributed in-memory cache system comprising a plurality of cache nodes:
  - obtain a redo log record for a write request to data stored in a distributed storage system that stores data on persistent storage, the distributed storage system comprising a plurality of storage nodes; and
  - cache the redo log record in memory;
  - send the redo log record to the distributed storage system;
  - receive a sufficient number of acknowledgments from different ones of the storage nodes to satisfy a write quorum requirement; and
  - responsive to the acknowledgments, acknowledge that the write request is completed.

18. The non-transitory computer-readable storage medium of claim 17, wherein to cache the redo log record in memory, the program instructions when executed by the one or more processors cause the one or more processors to apply the redo log record to a cached data page in the memory.

19. The non-transitory computer-readable storage medium of claim 17, wherein the program instructions when executed by the one or more processors cause the one or more processors to:
- receive a read request for a specified data;
- determine that one or more cache entries for the specified data in the distributed in-memory cache system are valid; and
- return the specified data obtained from the one or more cache entries.

20. The non-transitory computer-readable storage medium of claim 17, wherein the program instructions when executed by the one or more processors cause the one or more processors to:
- receive a read request for a specified data;
- determine that one or more cache entries for the specified data in the distributed in-memory cache system are invalid; and
- responsive to the determination:
  - obtain the specified data from the distributed storage system;
  - update the one or more cache entries with the obtained specified data; and
  - return the specified data obtained from the distributed storage system.

* * * * *